(12) United States Patent
Cullick et al.

(10) Patent No.: US 7,546,228 B2
(45) Date of Patent: Jun. 9, 2009

(54) STOCHASTICALLY GENERATING FACILITY AND WELL SCHEDULES

(75) Inventors: Alvin Stanley Cullick, Austin, TX (US); Keshav Narayanan, Austin, TX (US)

(73) Assignee: Landmark Graphics Corporation, Houston, TX (US)

(*) Notice: Subject to any disclaimer, the term of this patent is extended or adjusted under 35 U.S.C. 154(b) by 673 days.

(21) Appl. No.: 10/835,702

(22) Filed: Apr. 30, 2004

(65) Prior Publication Data

US 2004/0220846 A1 Nov. 4, 2004

Related U.S. Application Data

(60) Provisional application No. 60/466,582, filed on Apr. 30, 2003, provisional application No. 60/466,621, filed on Apr. 30, 2003.

(51) Int. Cl.
*G06F 7/60* (2006.01)
*G06F 17/10* (2006.01)
*G06F 9/46* (2006.01)

(52) U.S. Cl. .................. 703/10; 703/2; 705/8
(58) Field of Classification Search ............ 166/250.15
See application file for complete search history.

(56) References Cited

U.S. PATENT DOCUMENTS

| | | | | |
|---|---|---|---|---|
| 5,468,088 A | * | 11/1995 | Shoemaker et al. | 166/245 |
| 5,787,000 A | * | 7/1998 | Lilly et al. | 700/95 |
| 5,992,519 A | * | 11/1999 | Ramakrishnan et al. | 166/250.15 |
| 6,430,522 B1 | * | 8/2002 | O'Brien et al. | 702/181 |
| 6,446,721 B2 | * | 9/2002 | Patel et al. | 166/252.1 |
| 6,584,369 B2 | * | 6/2003 | Patel et al. | 700/100 |
| 6,725,428 B1 | | 4/2004 | Pareschi et al. | |
| 6,980,940 B1 | * | 12/2005 | Gurpinar et al. | 703/10 |
| 7,020,619 B2 | * | 3/2006 | Thompson | 705/8 |
| 7,032,689 B2 | * | 4/2006 | Goldman et al. | 175/39 |
| 7,092,894 B1 | * | 8/2006 | Crone | 705/8 |
| 2002/0032695 A1 | | 3/2002 | Blume et al. | |

(Continued)

OTHER PUBLICATIONS

Hydocarbon Production Scheduling with Genetic Algorithms, Hardling et al, SPE Journal, pp. 99-107, Jun. 1998.*

(Continued)

*Primary Examiner*—Paul L Rodriguez
*Assistant Examiner*—Dwin M Craig
(74) *Attorney, Agent, or Firm*—Meyertons Hood Kivlin Kowert & Goetzel, P.C.; Jeffrey C. Hood; Mark K. Brightwell

(57) ABSTRACT

A system comprising a memory and a processor. The memory is configured to store data and program instructions for a processing method. The processor is configured to read the program instructions from the memory. In response to execution of the program instructions, the processor is operable to: (a) instantiate one or more well process times associated with a first schedule; (b) instantiate a facility establishment time associated with first schedule; (c) instantiate zero or more dependency delays associated with the first schedule; (d) resolve event dates in the first schedule based on resolved event dates in one or more other schedules, the one or more instantiated well process times, the instantiated facility establishment time, and the instantiated dependency delays; (e) compute costs for facility establishment and well processes (e.g., well drilling and well completion) using the resolved event dates.

51 Claims, 17 Drawing Sheets

U.S. PATENT DOCUMENTS

| | | | |
|---|---|---|---|
| 2002/0174222 | A1 | 11/2002 | Cox |
| 2003/0018508 | A1 | 1/2003 | Schwanke |
| 2003/0167110 | A1 | 9/2003 | Smith et al. |
| 2004/0015821 | A1 | 1/2004 | Lu et al. |
| 2005/0149307 | A1* | 7/2005 | Gurpinar et al. .............. 703/10 |

OTHER PUBLICATIONS

"Optimization of Production Strategies using Stochastic Search Methods", Harding et al, SPE 35518, SPE 1996.*

High-Resolution Reservoir Models Integating Multiple-Well Production Data, Wen et al, SPE Journal, 1998.*

"Surface-Geometry and Trend Modeling for Integration of Stratigraphic Data in Reservoir Models", Xie et al, SPE 68817, 2001.*

PCT Application No. PCT/US04/13420, International Search Report mailed Aug. 26, 2005.

* cited by examiner

Examples of schedule constraints (i.e., "rules"):

X days after the start date of another schedule;
X days after the end date of another schedule;
X days after the start of drilling (of first well) in another schedule;
X days after the end of drilling (of last well) in another schedule;
X days after the start of the completion process (of first well) in another schedule;
X days after the end of the completion process (of last well) in another schedule; or
X days after the start of production (of first well) in another schedule
X days after the drilling of some subset of wells, begin completion of that set.
X days after the completion of some subset of wells, begin the production or injection of that set;
Number of drilling rigs available.

Fig. 5

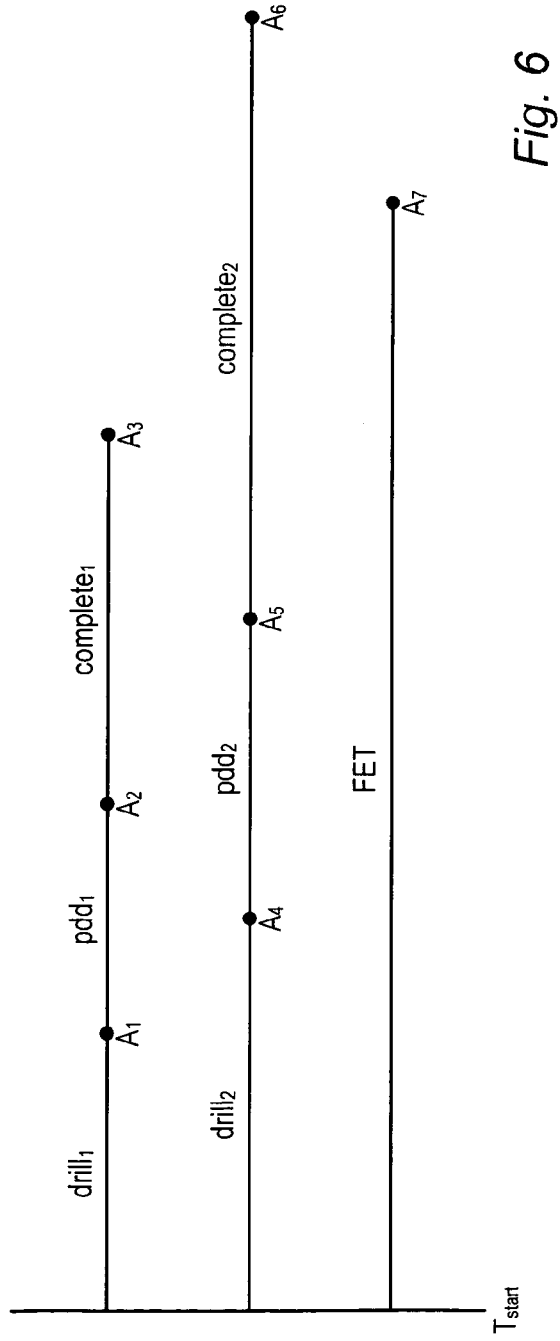

Fig. 6

STOCHASTICALLY GENERATING FACILITY AND WELL SCHEDULES

CONTINUATION DATA

This application claims the benefit of priority of U.S. Provisional Application No. 60/466,582 filed on Apr. 30, 2003 entitled "Stochastically generating facility and well schedules" invented by Alvin Stan Cullick and Keshav Narayanan. This provisional application is hereby incorporated by reference in its entirety.

This application claims the benefit of priority of U.S. Provisional Application No. 60/466,621 filed on Apr. 30, 2003 entitled "Method and system for scenario and case decision management" invented by Cullick, Narayanan and Wilson. This provisional application is hereby incorporated by reference in its entirety.

BACKGROUND OF THE INVENTION

1. Field of the Invention

This invention relates generally to the field of resource planning and scheduling, and, more particularly, to a system and method for generating schedules that model the processes involved in the exploitation of petroleum reservoirs.

2. Description of the Related Art

The exploration and producing (E&P) industry is challenged by making large capital investments in facilities (e.g., well production platforms, pipelines, and processing production facilities) and wells over a long time period, often a number of years, prior to oil and gas production and revenue generation. During this long period of facility construction and well drilling and completion, there exists the potential for a number of events that increase project risks and threaten expected economic returns. These include lack of drilling rig availability, increases in the cost of rig procurement, adverse weather conditions, destabilizing political events, unforeseen construction delays, and poor drilling conditions. Also, during the period of time in which the industry is planning and constructing the facilities, new information about the underlying oil and gas resources in the reservoirs is developed and leads to uncertainty in the number and location of wells needed eventually to develop the resource. Thus, there exists a substantial need for a system and methodology capable of generating schedules that take into account the effects of uncertain events of various kinds.

As used herein the term "facility" refers to a system that receives one or more streams of fluids from a set of wells and/or other facilities, and outputs one or more separate streams of gas, oil, and water to a set of storage vessels, pipelines, or other facilities. Facility is used as a general term to encompass oil and gas field gathering systems, processing platform systems, and well platform systems.

SUMMARY

In various embodiments, a system for stochastically generating one or more schedules may include a schedule manager, an asset assigner and a schedule configuration tool. The asset assigner and schedule configuration tool allow a user to specify a system of component schedules that together form a global schedule for a project. The asset assigner allows the user to create component schedules and to assign wells and facilities to the component schedules.

Each component schedule may include a set of random variables that model processes such as well drilling and completion for a set of wells, and facility establishment for a set of facilities. The user may assign probability density functions to the random variables using the schedule configuration tool. Furthermore, the schedule configuration tool enables the user to specify constraints on schedule event dates. A few examples of such constraints are (a) "schedule B starts no earlier than the end of schedule A";
(b) "schedule C starts X days after Project Start";
(c) "schedule D starts no earlier than the start of production from schedule A";
(d) "schedule E must begin on the date Y"; and
(e) "schedule F starts Z days after schedule C";

where X, Y and Z are user specified random variables. (This list of constraints is meant to be suggestive and not exhaustive.)

The schedule configuration tool controls a stochastic (i.e., random) simulation. One type of random simulation is a Monte Carlo simulation. In each iteration of the Monte Carlo simulation, a realization of the global schedule is generated by computing instantiated values (i.e., realizations) of the random variables in each component schedule and the random variables associated with inter-schedule dependencies, and resolving the dates of events (e.g., start and end dates of the modeled processes) in each component schedule based on the instantiated values. The resolution of event dates respects the user specified constraints as well as global constraints such as the constraint that no well produce (or inject) before its associated facility has finished with facility establishment.

There exist a number of variations to the stochastic Monte Carlo simulation technique. In one set of embodiments, the Monte Carlo simulation technique randomly selects values for all parameters. In another set of embodiments, the Monte Carlo simulation technique is modified by variations on the stochastic sampling. One such sampling embodiment is the Latin-hypercube sampling technique described in the following references:

"Controlling Correlations in Latin Hypercube Samples", B. Owen, Journal of the American Statistical Association, vol. 89, no. 428, pp 1157-1522, December 1994;

"Large Sample Properties of Simulations using Latin Hypercube Sampling", M. Stein, Technometrics, vol. 29, no 2, pp 143-151, May 1987.

These references are hereby incorporated by reference in their entirety.

Another sampling embodiment is the Hammersly sequence sampling technique described in the following reference:

"An Efficient Sampling Technique for Off-line Quality Control", Jayant R. Kalagnanam and Urmila M. Diwekar, Technometrics Vol. 39, 1997, p. 308-319.

This reference is hereby incorporated by reference in its entirety.

The global schedule may be interpreted as a stochastic process that represents a project from start to finish. The ensemble of realizations of the global schedule generated in repeated iterations of the Monte Carlo simulation represents a finite sampling of this stochastic process. The ensemble of realizations of the global schedule may be supplied as output for user analysis and/or computer analysis. Statistics on capital expenditure, revenue and profit calculated via computer analysis of the ensemble may be informative for the planning of reservoir exploitation projects.

The schedule manager allows the user to view summary information about the component schedules and to delete any of component schedules.

In various embodiments, the stochastic schedule generating system may have the following characteristics.
(1) The system generates a system of facility establishment and well drilling and completion schedules that honor user imposed boundary conditions and constraints.
(2) Uncertainty is incorporated within the schedules by design. The boundary conditions and constraints and the inter-dependencies can be represented by probability density functions (PDFs).
(3) The parameters determined by the system in each iteration of the Monte Carlo simulation have an inherent temporal ordering.
(4) Schedules generated by the system are made available to production profile and/or economic algorithms for further processing.
(5) Investment profiles over time generated for the multiple schedules inherently preserve the uncertainty and inter-dependency conditions.

BRIEF DESCRIPTION OF THE DRAWINGS

A better understanding of the present invention can be obtained when the following detailed description is considered in conjunction with the following drawings, in which:

FIG. 5 lists examples of constraints that the user may impose a schedule (especially on the event dates in a schedule);

FIG. 6 illustrates an example of event date resolution for a schedule including one facility and two associated wells, where the wells are drilled in parallel;

Figure 1:
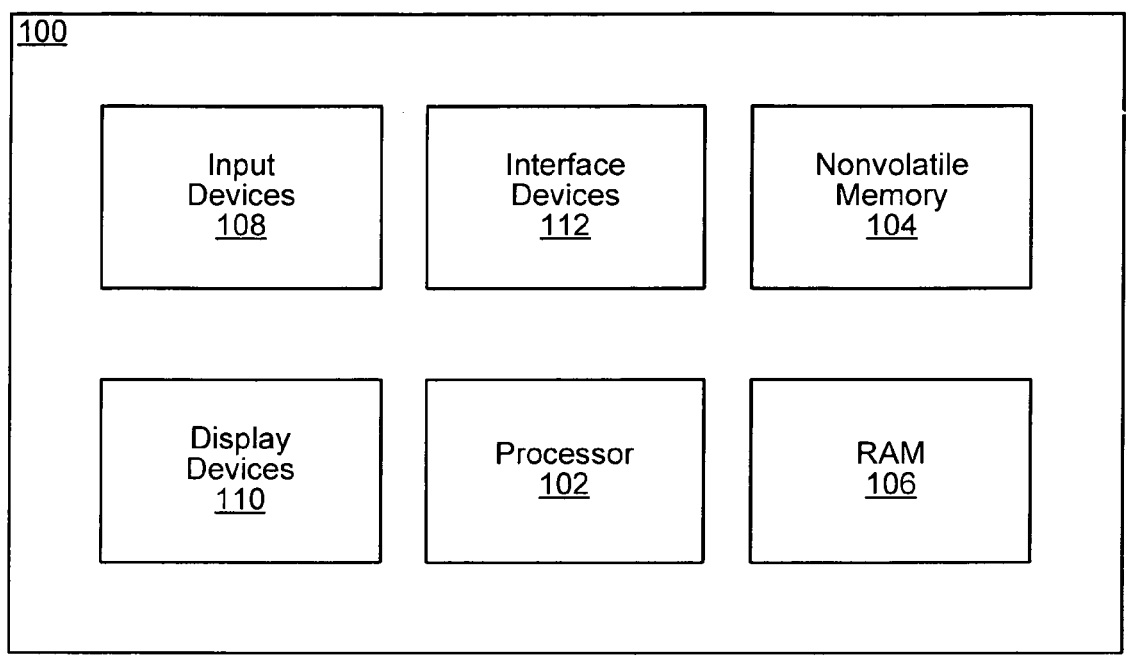
FIG. 1 illustrates one set of embodiments of a computer system operable to execute the asset assigner, the schedule configuration tool, the schedule resolver, the instantiation module, the iterative process, and, more generally, any combination of the computational methods described herein.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

In various embodiments, a computer system may execute programs such as an asset assigner, a schedule configuration tool and a schedule resolver to support the generation of schedules. The asset assigner and schedule configuration tool allow a user to specify a global schedule for a petroleum exploration and production project. The global schedule represents a project from start to finish and includes a set of one or more component schedules. The asset assigner may be used to create the component schedules and assign assets such as wells and facilities to the component schedules.

Each component schedule may include a set of schedule variables that model the time durations of processes such as: drilling and completion for a number of wells; and facility establishment for a number of facilities. Because the time durations are often uncertain quantities, the schedule configuration tool allows the user to characterize the uncertainty of each schedule variable. For example, the user may specify a probability density (or a discrete probability distribution) for a schedule variable. Alternatively, the user may specify a set of attainable values for a schedule variable. Furthermore, the schedule configuration tool allows the user to specify constraints such as:

(a) "schedule B starts no earlier than the end of schedule A";
(b) "schedule C starts X days after Project Start";
(c) "schedule D starts no earlier than the start of production from schedule A";
(d) "schedule E starts on date Y"; and
(e) "schedule F starts Z days after schedule C".

This list of constraints is meant to be suggestive and not exhaustive. A variables such as X, Y or Z that relates to a constraint on an event date is referred to herein as a dependency variable. As with the schedule variables, the schedule configuration tool allows the user to characterize the uncertainty of each dependency variable.

The schedule resolver operates in the context of an iterative process. Within each iteration of the iterative process, an instantiation module may generate instantiated values (i.e., realizations) for the schedule variables in each component schedule and instantiated values for the dependency variables, and the schedule resolver may use the instantiated values to resolve events dates in each component schedule in accordance with the user-defined constraints. Event dates include dates such as: drilling start and end dates, completion start and end dates and production (or injection) start dates for wells; and, start and end dates for the establishment of facilities. The term "facility establishment" is used herein to describe any collection of processes that contribute to the working realization of a facility. Thus, facility establishment may include processes such as engineering design, detailed design, construction, transportation, installation, conformance testing, etc. Each facility has a capital investment profile (i.e., a time series of capital expenditures) that is determined in part by the time duration of the various establishment processes.

The set of resolved component schedules form an instantiation of the global schedule. The ensemble of instantiations of the global schedule generated in repeated iterations of the iterative process may be supplied as output for user analysis and/or computer analysis.

FIG. 1 illustrates one embodiment of a computer system 100 operable to execute the asset assigner, the schedule configuration tool, the schedule resolver, the instantiation module, the iterative process, and, more generally, any combination of the computational methods described herein. Computer system 100 may include a processor 102, memory (e.g. random access memory 106 and/or nonvolatile memory devices 104), one or more input devices 108, one or more display devices 110, and one or more interface devices 112. These component subsystems may be interconnected according to any of a variety of configurations or system topologies. Nonvolatile memory devices 104 may include devices such as tape drives, disk drives, CD-ROM drives, semiconductor ROM or EEPROM, etc. Input devices 108 may include devices such as a keyboard, mouse, digitizing pad, trackball, touch-sensitive pad and/or light pen. Display devices 110 may include devices such as monitors, projectors, head-mounted displays, etc. Interface devices 112 may be configured to receive data from and/or transmit data to one or more remote computers and/or storage devices through a network.

Processor 102 may be configured to read program instructions and/or data from RAM 106 and/or nonvolatile memory devices 104, and to store computational results into RAM 106 and/or nonvolatile memory devices 104. The program instructions may include program instructions embodying any of the computational methods described herein, or, any combination thereof. The program instructions may also include an operating system and a set of device drivers.

It is noted that any of the various computational methods described herein, and combinations thereof, may be implemented as a system of software programs for execution on any of a variety of computer systems such as desktop computers, minicomputers, workstations, multiprocessor systems, parallel processors of various kinds, distributed computing networks, etc. The software programs may be stored onto any of a variety of memory media such as CD-ROM, magnetic disk, bubble memory, semiconductor memory (e.g. any of various types of RAM or ROM). Furthermore, the software programs and/or the results they generate may be transmitted over any of a variety of carrier media such as optical fiber, metallic wire, free space and/or through any of a variety of networks such as the Internet and/or the PSTN (public switched telephone network).

Figure 2:
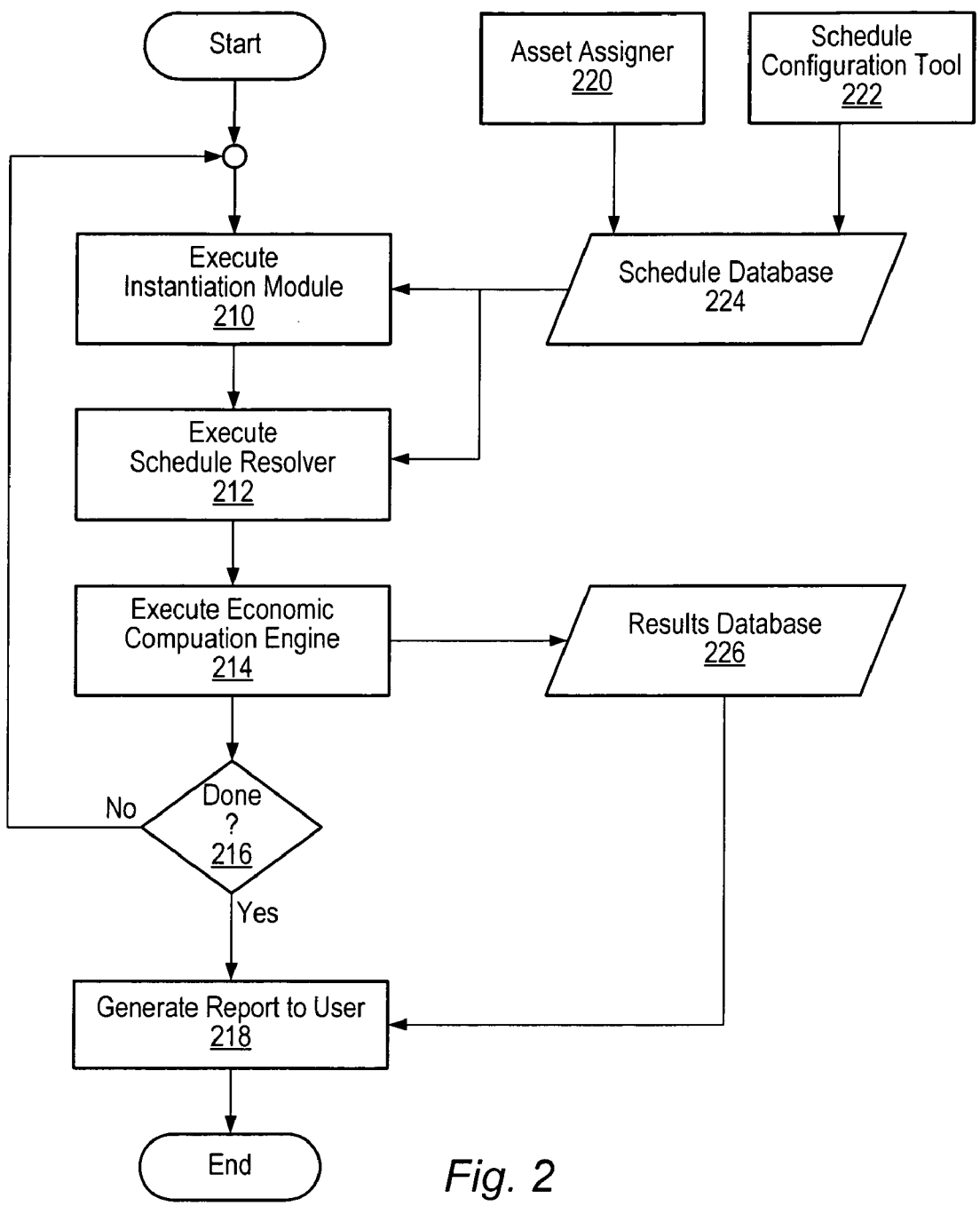
FIG. 2 illustrates one set of embodiments of a method for generating schedule using an iterative process.

FIG. 2 illustrates one set of embodiments of a methodology for generating instantiations (i.e., realizations) of the global schedule using an iterative process. The asset assigner 220 allows the user to create component schedules and to assign assets such as wells and facilities to the component schedules. Data representing the component schedules and the assignment of assets to each component schedule may be stored in schedule database 224. The schedule configuration tool 222 allows the user to specify schedule configuration data defining: the uncertainty of schedule variables associated with the component schedules; constraints on event dates in the component schedules; and the uncertainty of dependency variables corresponding to the constraints. The schedule configuration data may also be stored in schedule database 224. Schedule database 224 may be an allocated portion of RAM 106.

In step 210, the processor 102 may execute the instantiation module to generate instantiated values for the schedule variables in each component schedule and instantiated values for the dependency variables. The instantiation module reads the schedule configuration data from the schedule database 224, and generates the instantiated values of schedule variables and dependency variables by any of a variety of methods.

The instantiation module may be configured to operate in one or more random modes and one or more non-random modes. In the random modes, each of the schedule variables and dependency variables may be assigned a probability distribution function, or equivalent, a probability density function, in a preliminary setup phase. The instantiation module uses the probability distributions to generate the instantiated values. In one random mode (i.e., the Monte Carlo mode), the instantiation module may generate the instantiated values by means of quantile value section. In another random mode, the instantiation module may generate the instantiated values by means of Latin Hypercube sampling. In yet another random mode, the instantiation module may generate the instantiated value by means of Hammersly sequence sampling.

The instantiation module may also be configured to operate in one or more non-random modes. Examples of non-random modes include a discrete combinations mode and a sensitivity analysis mode. In the discrete combinations mode, the schedule variables and the dependency variables may be assigned sets of attainable values (instead of probability distributions) in the preliminary setup phase, and the instantiation module may step exhaustively through all possible states in the Cartesian product of the assigned sets, one step per iteration of the iterative process. In the sensitivity analysis mode, the schedule variables and dependency variables may be assigned sets of attainable values (instead of probability distributions) in a preliminary setup phase, and the instantiation module may explore along linear paths in the Cartesian product by varying one variable at a time through its set of attainable values while maintaining all other variables constant. The discrete combinations mode and the sensitivity analysis mode are described at length later in this specification.

In step 212, the processor 102 executes the schedule resolver in order to resolve the events dates for the assets (e.g., wells and facilities) assigned to each component schedule. The schedule resolver uses the instantiated values generated in step 210 to resolve the event dates. The resolution of event dates respects the user-defined constraints. Thus, the schedule resolver accesses the constraint data stored in the schedule database 224 in the process of performing the event date resolution.

In step 214, an economic computation engine may operate on a set of input data, including the resolved event dates from the component schedules, to compute economic output data. The economic output data may include a stream of investments and returns over time. (The costs associated with drilling and completing wells and establishing facilities are interpreted as investments. These costs are in part determined by the time duration of each respective process. The production of oil and gas from wells represents a return on investment.) The economic output data may also include a net present profit value summarizing the present effect of the stream of investments and returns. The economic output data may be stored in a results database 226. The results database 226 may be an allocated portion of RAM 106.

In step 216, the processor may determine if a termination condition for the iterative process has been satisfied. If the termination condition has not been satisfied, the processor may continue processing with step 210, and thus, perform another iteration of steps 210, 212 and 214. If the termination condition has been satisfied, the processor may continue processing with step 218. Any of various termination conditions may be employed. For example, in one embodiment, the processor may be programmed to determine if the number of iteration so far performed is greater than or equal to a maximum number of iterations specified by the user. In another embodiment, the processor may be programmed to determine if an amount of computer time so far expended is greater than or equal to a maximum amount of time specified by the user.

In step 218, the processor may access the economic data (generated in each iteration of the iterative process) from the results database, and analyze the economic data in order to generate a summary report. The processor may present the summary report to the user on a display device. The summary report may include graphs of investments and returns over time for each of the iterations superimposed in a display window. The summary report may also, or alternatively, include a histogram of net present value.

In one alternative embodiment, step 214 is omitted and the schedule resolver stores the resolved component schedules (including the resolved event dates) in the results database. In this embodiment, step 218 may be replaced with a step 218B that generates a summary report (e.g., a graphical report) of the information represented in the set of resolved component schedules generated in each iteration of the iterative process.

Figure 3:
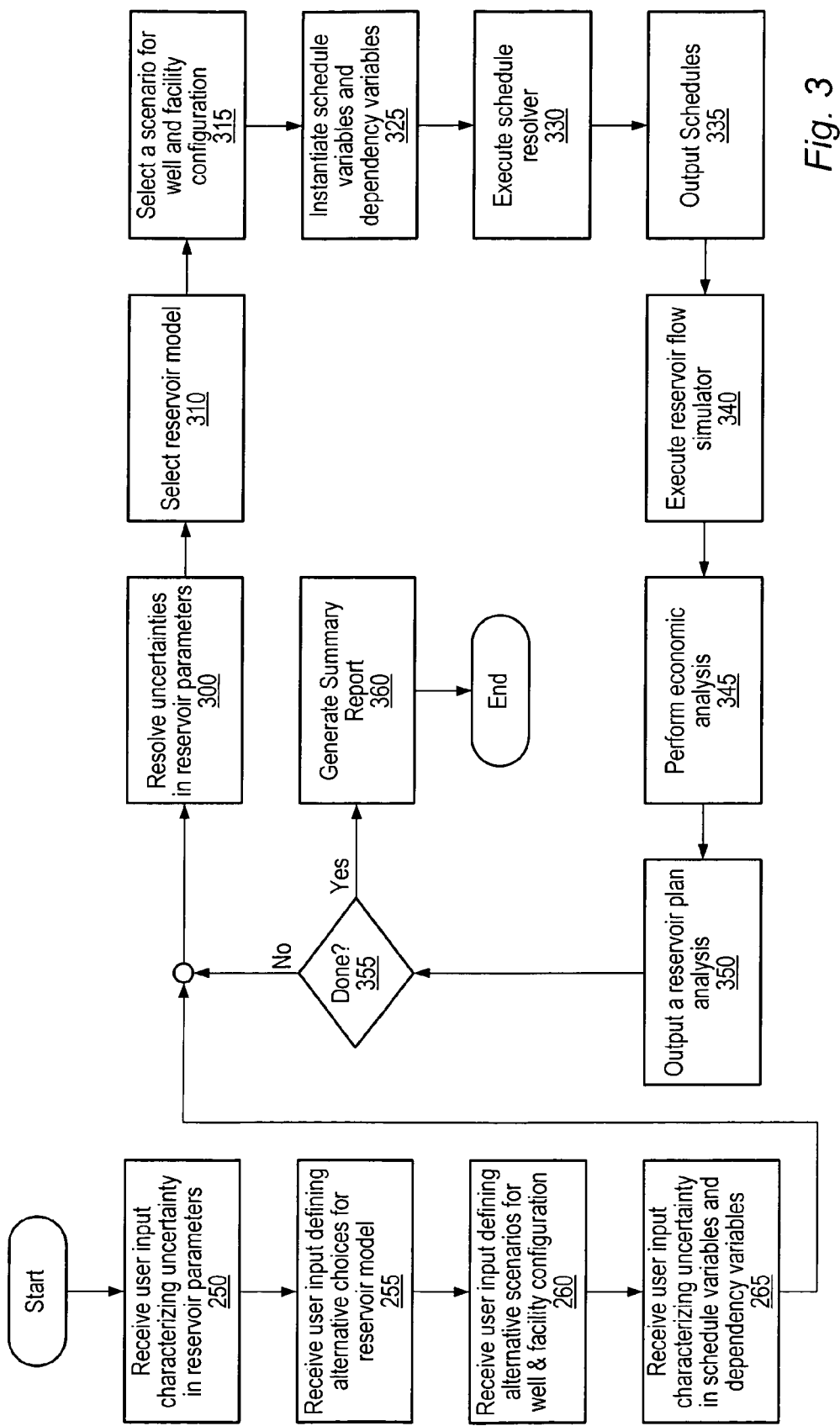
FIG. 3 illustrates one set of embodiments of a methodology for estimating the economic impact of uncertainties in a petroleum exploration and production project.

FIG. 3 illustrates one set of embodiments of a methodology for estimating the economic impact of uncertainties in a petroleum exploration and production project. The methodology uses an iterative process to generate instantiations of global schedule.

In step 250, a processor (such as processor 102) may receive user input characterizing the uncertainty of various reservoir parameters, e.g., parameters such as volume, hydrocarbon deliverability to wells, and geologic facies architecture.

In step 255, the processor may receive user input defining a set of alternative choices for reservoir model. Examples of possible choices include scenarios of a geologic depositional system or different interpretations from seismic data of numbers and geometries of faults.

In step 260, the processor may receive user input defining a set of alternative scenarios for well and facility configuration. A scenario for well and facility configuration may include a specification of: a number of production wells, a number of injection wells, surface locations for each well, 3D well plan for each well, number of facilities of various types, locations for each of the facilities, assignments of wells to facilities, and connections between facilities and their assigned wells.

In step 265, the processor may receive user input creating component schedules, characterizing the uncertainty of schedule variables in the component schedules, defining constraints on event dates in the components schedules, and characterizing the uncertainty of any dependency variables associated with the constraints.

In step 300, a processor may resolve uncertainties in, i.e., compute instantiated values for, the reservoir parameters.

In step 310, the processor may select a reservoir model from the set of alternative choices established in step 255.

In step 315, the processor may select a scenario for well and facility configuration from the set of alternative scenarios defined in step 260.

In step 325, the processor computes instantiated values for the schedule variables associated with each component schedule (e.g., schedule variables such as well drilling time, post-drilling delay, well completion time, facility establishment time) and instantiated values for the dependency variables associated with the constraints.

In step 330, the processor may execute the schedule resolver to resolve event dates for each of the component schedules based on the instantiated values computed in step 325.

In step 335, the processor may output the resolved events dates from each component schedule to a memory buffer, e.g., an allocated portion of RAM 106.

In step 340, the processor may execute a reservoir flow simulator to determine profiles of oil, gas and water production as a function of time. The reservoir flow simulator operates on the instantiated reservoir parameters computed in step 300, the reservoir model selected in step 310, the well and facility configuration scenario selected in step 315, and the resolved event dates of the component schedules.

In step 345, the processor may perform an economic analysis (e.g., by executing the economic computation engine described variously herein) based on the production profiles generated by the reservoir flow simulator and the resolved schedule event dates. The economic analysis produces economic output data such as a stream of investments and returns over time. The economic output data may also include a net present profit value summarizing the present effect of the stream of investments and returns. The economic output data may be stored in memory (e.g., RAM 106) for later review and analysis.

In step 350, the processor may output the results of the previous steps, that is an instance of a reservoir plan analysis, which is a plan over time for drilling wells, installing facilities and producing oil and gas, that represent the impacts of the resolved uncertainties described above.

In step 355, the processor may determine if a termination condition for the iterative process has been satisfied. If the termination condition has not been satisfied, the processor may continue processing with step 300, and thus, perform another iteration of steps 300 through 350. If the termination condition has been satisfied, the processor may continue processing with step 360.

In step 360, the processor may analyze the economic output data and generate a summary report. The processor may present the summary report to the user on a display device. The summary report may include graphs of investments and returns over time for each of the iterations superimposed in a display window. The summary report may also, or alternatively, include a histogram of net present value.

As described above, steps 300-325 involve the instantiation of uncertain variables and parameters and selections from sets of alternative choices. These instantiations and selections may be performed in accordance with any of the random modes and non-random modes mentioned above.

Asset Assigner

The asset assigner supports a graphical user interface through which a user (or a set of users) may select wells and/or facilities and assign them to a schedule. The asset assigner may present a list of wells and facilities from a database that has been generated by the user, or, automatically generated by an asset planning tool. The user may select one or more wells and/or facilities from the list, and initiate an addition operation that (a) assigns the selected wells and/or facilities to an existing schedule, or, (b) creates a new schedule and assigns the selected wells and/or facilities to the newly created schedule.

The asset assigner may manage a graphical user interface (GUI) through which the user may select wells and/or facilities and assign them to schedules. The asset assigner GUI may include a selection window. The selection window may contain a list of entries. Each entry describes a well or a facility. Each entry may include fields such as name, type, status and schedule. The type field of an entry indicates whether the entry corresponds to a production well, an injection well or a facility. The name field of an entry displays the user-defined name of the corresponding well or facility. The status field of an entry indicates if the corresponding well or facility has already been assigned to a schedule. The schedule field of an entry specifies the name of the schedule to which the corresponding well or facility has been assigned.

The user may select one or more of the wells and/or one or more of the facilities displayed in the selection window, and, initiate the addition operation, e.g., by selecting an add control button (ACB) of the asset assigner GUI. As part of the addition operation, the asset assigner may prompt the user to select an existing schedule from a displayed list of existing schedules, or, to specify the name of a new schedule to be created. In the former case, the asset assigner adds the one or more selected wells and/or facilities to the selected existing schedule. In the later case, the asset assigner creates a new schedule having the specified name, and adds the one or more selected wells and/or facilities to the new schedule.

The user may also remove wells and/or facilities from schedules. For example, the user may select from the selection window one or more wells and/or facilities that have been previously assigned to a schedule (or a set of schedules), and invoke a removal operation to de-assign the selected wells and/or facilities from the schedule (or the set of schedules). The user may invoke the removal operation by selecting a removal control button (RCB) of the asset assigner GUI.

As described above, the asset assigner supports the assignment of wells and facilities to any number of schedules desired by the user. Multiple schedules may be relevant in a variety of situations. For example, multiple drilling rigs may become available from contractors at different times. The amount of time for a drilling rig to become available may be uncertain (as it is dependent on market demand). Thus, a separate schedule may be assigned for each drilling rig to model the random time delay in acquiring the drilling rig. Similarly, multiple completion equipment rigs may become available at different times, each with a corresponding random delay. Furthermore, facility components (e.g. compressors, separators, pipes, etc.) may be designed and fabricated by different processes and contractors on different schedules.

As indicated above, an automated asset planning tool may be used to generate a database of wells and facilities. The database may include the location of each well top on a coordinate map and the geometry of each well in the subsurface geological structure in three-dimensional space. The well is defined by a set of coordinates from which the length of the well or individual segments of the well may be computed. The wells may be organized into groups according to the facility to which they are coupled.

The automated asset planning tool may also generate ordering and ranking information for the wells and facilities. For example, the automated asset planning tool may order wells and facilities based on criteria such as drilling cost, facility establishment cost, and conditions and/or properties of the reservoirs which supply the wells and facilities.

Alternatively, the user may turn on a random order switch for a schedule to invoke random ordering of the wells of the schedule for drilling and completion. In each iteration of the iterative process, a different random ordering of the wells may be selected.

As yet another alternative, the order of wells for drilling and completion in a schedule may be chosen based on a set of user-defined conditions. For example, the user might choose to have all wells from each platform drilled in a sequence before moving to the another platform, that is "drill all the wells in sequence, but which are coupled to each platform", or the user might choose to have all the wells for each geologic formation drilled in a sequence before moving to another geologic formation disregarding which platforms with which the wells are associated, that is "drill all the wells in sequence, but which are targeted to each subsurface geologic formation".

As used herein the term "well completion" refers to a set of procedures which may include multiple tasks such as setting packers, installing valves, cementing, fracturing, perforating etc. This set of procedures results in the establishment and/or improvement of the physical connection between a well and the reservoir rock, so that hydrocarbons and water can flow more easily between the reservoir and the well, and in mechanically stabilizing the well to physical stresses.

Figure 4:
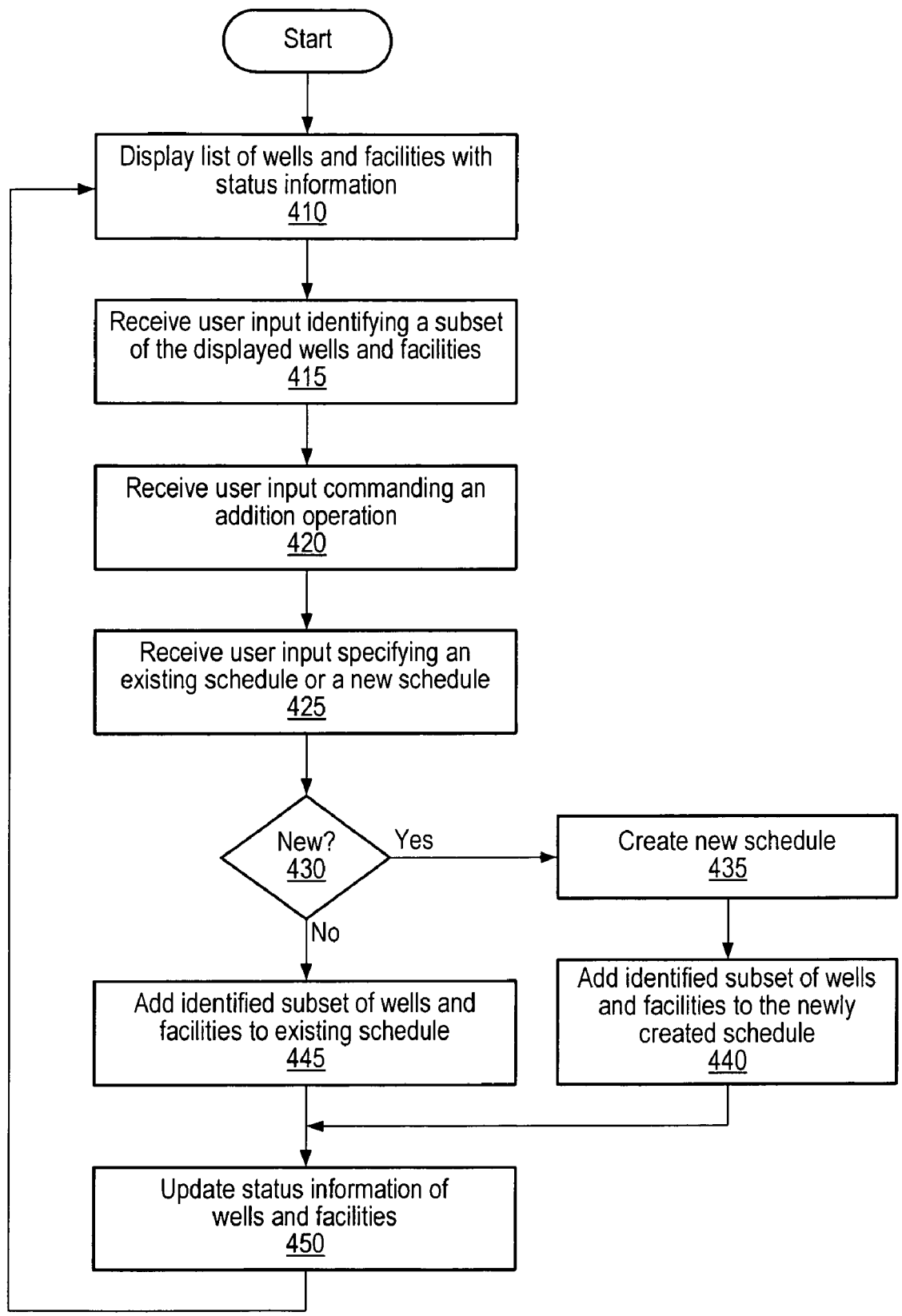
FIG. 4 illustrates one set of embodiments of a methodology to allow users to add assets (such as wells and facilities) to schedules.

In one set of embodiments, the asset assigner may execute the following methodology to allow users to add assets (such as wells and facilities) to schedules as illustrated in FIG. 4.

In step 410, the asset assigner may display a list of assets (i.e., wells and facilities) on a display device. Each entry in the list may include information identifying the name of the asset (well or facility) and status information such as the name of the schedule to which the asset has been assigned (if any).

In step 415, the asset assigner may receive user input identifying a subset of the displayed wells and facilities. For example, the user may click on each on a well or facility in the displayed list to identify it as part of the subset.

In step 420, the asset assigner may receive user input commanding an addition operation, i.e., an addition of the identified subset of wells and facilities to a schedule.

In step 425, the asset assigner may receive user input specifying an existing schedule, or, specifying the name of a new schedule to be created, as the target of the addition operation.

In step 430, the asset assigner may determine if the user has specified a new schedule or an existing schedule as the target of the addition operation. If the user has specified a new schedule, step 435 is performed. Otherwise, step 445 is performed.

In step 435, the asset assigner creates a new schedule. The new schedule is given the user-specified name. In step 440, the asset assigner adds (i.e., assigns) the identified subset of wells and facilities to the newly created schedule. In step 450, the asset assigner updates the status information in the asset list to reflect the assignment of the identified subset of wells and facilities to the newly created schedule. After step 450, the asset assigner may continue processing with step 410.

As indicated above, if the user has specified an existing schedule as the target of the addition operation, step 445 is performed. In step 445, the asset assigner adds (i.e., assigns) the wells and facilities of the identified subset to the user-specified existing schedule. In step 450, the asset assigner updates the status information in the asset list to reflect the assignment of the identified subset of wells and facilities to the existing schedule. After step 450, the asset assigner may continue processing with step 410.

Schedule Configuration Tool

As described above, wells and/or facilities may be associated with schedules using the asset assigner. In one set of embodiments, each schedule may involve the drilling and completion of one or more wells, and/or, the establishment of one or more facilities. Thus, each well associated with a schedule has a drill start date, a drill end date, a completion start date, a completion end date, and a production (or injection) start date. Each facility associated with a schedule has an establishment start date and an establishment end date. A well is said to be ready for production (or injection) at its completion end date. However, the production (or injection) start date for a well is delayed if the well's completion end date precedes the establishment end date of the facility to which the well is connected.

The schedule configuration tool may support a graphical user interface (GUI) through which a user (or set of users) may provide various kinds of input data for any given schedule. In one set of embodiments, the user may specify:

(1) an order in which wells associated with the given schedule are to be drilled;
(2) the uncertainty of the time duration of drilling each well associated with the given schedule;
(3) the uncertainty of the delay time between the end of drilling to the start of the completion process for each well associated with the given schedule;
(4) the uncertainty of the time duration of the completion process of each well associated with the given schedule;
(5) the uncertainty of the time duration of the establishment process for each facility associated with the given schedule;
(6) a sequential mode or a parallel mode for handling the establishment processes of the facilities associated with the given schedule;
(7) an "after each" mode or an "after all" mode for handling the completion of wells in the given schedule;
(8) time constraints that qualify events (such as start date, date of first production, date of first injection) in the given schedule relative to events in other schedules or fixed points in time.

The schedule configuration tool allows the user to specify the uncertainty of a variable in a number of different ways. In one or more random modes of operation, the schedule configuration tool allows the user to specify a probability density function (PDF) or discrete probability distribution for the variable. In one or more non-random modes, the schedule configuration tool may allows the user to specify a set of values attainable by the variables.

The specification of a discrete probability distribution for a discrete random variable X may involve the specification of a list of pairs $(X_K, P_K)$, where $X_K$ is a value attained by the discrete variable and $P_K$ is the associated probability. For ease of input, the user may specify the pairs as a list of the form: $X_1, P_1, X_2, P_2, \ldots, X_N, P_N$; or, in one alternative embodiment, a list of the form $X_1 (P_1), X_2 (P_2), \ldots, X_N (P_N)$. N is the number of states attained by the discrete variable. The probabilities $P_K$ may add to one. In some embodiments, the schedule configuration tool allows the user to enter weights $W_K$ that do not necessarily add to one, instead of the probability values $P_K$. The schedule configuration tool performs a normalization computation to compute the probabilities $P_K$ from the weights $W_K$.

To support the specification of a continuous random variable, the schedule configuration tool may offer the user a choice of standard PDFs that include a normal distribution, a lognormal distribution, a beta distribution, a triangular distribution, a gamma distribution, an exponential distribution, and a uniform distribution. For example, the user may select one of the standard PDFs, and specify PDF characterizing parameters such as mean and standard deviation (or endpoints of the interval of definition in the case of a uniform distribution).

In some embodiments, the schedule configuration tool allows the user to specify mixed random variables which are weighted combinations of discrete random variables and continuous random variables.

As noted in (1) above, the user may specify the order in which wells are drilled. The user may also specify the order of establishment of the facilities. The later ordering is significant when the sequential establishment mode is selected in (6) above. The ordering of the wells may be independent of the ordering of the facilities.

In one set of embodiments, the GUI of the schedule configuration tool may include an ordering window. The ordering window presents a list of the wells and facilities assigned to the given schedule. The user may manipulate the position of wells and facilities in the displayed list, and thus, achieve any desired ordering of wells and/or facilities.

The wells may also be ordered based on the facilities to which the wells belong. Thus, for example, the user may specify that the wells belonging to a first facility should be drilled before the wells belonging to a second facility, and so on.

The schedule configuration tool may also present the user with a set of choices of special well orderings and special facility orderings. For example, the user may select that the wells be ordered according to factors such as expected drilling cost, expected drilling time, expected production potential, expected reservoir quality and that the facilities be ordered according to factors such as establishment cost, establishment time, expected production potential of the wells associated with the facility. The asset planning tool may provide estimates for such factors for each well and/or facility.

As noted in (2) above, the user may specify the uncertainty associated with a delay time intervening between the drilling end date and the completion start date. This delay time may be used to model an intervening process planned by the user or to model a delay in the acquisition of equipment required for the completion process.

As noted in (6) above, the establishment of the facilities associated with the given schedule may proceed in parallel or sequentially. In the parallel mode, the facilities associated with the given schedule are all established in parallel (e.g., starting from the schedule start date). In the sequential mode, the facilities associated with the given schedule are established sequentially (e.g., starting from the schedule start date). The establishment time duration is the time duration for establishment of each facility.

As noted in (7) above, the completion of wells in the given schedule may be handled in different ways depending on a mode selection. In the "after each" mode, each well may be completed after it is finished with drilling. In the "after all" mode, the wells may be completed after all wells are finished with drilling, i.e., after the last of the wells is finished with drilling.

The user may specify constraints (also referred to as "rules") on the given schedule as suggested in FIG. 5. Schedule constraints include time constraints that qualify events in the given schedule relative to one or more events in one or more other schedules. For example, the user may specify a constraint that an event in the given schedule occur:

(a) X days after the start date of another schedule;
(b) X days after the end date of another schedule;
(c) X days after the start of drilling (of first well) in another schedule;
(d) X days after the end of drilling (of last well) in another schedule;
(e) X days after the start of the completion process (of first well) in another schedule;
(f) X days after the end of the completion process (of last well) in another schedule; or
(g) X days after the start of production (of first well) in another schedule;

where X is a user specified constant or a variable whose uncertainty may be specified, e.g., with a PDF, a discrete probability distribution, or a set of attainable values). (This list of constraints is meant to be suggestive and not exhaustive.) The delay time X is referred to as a dependency variable.

The user may also specify constraints that qualify one or more events in the given schedule relative to one or more events in the given schedule. For example, the user may specify constraints such as:

(h) X days after the drilling of some subset of the wells in the given schedule, begin completion of the wells in the given schedule;
(i) X days after the completion of some subset of the wells in the given schedule, being production or injection for the wells in the given schedule.

In some embodiments, the user may specify whether there will be a single drilling rig or more than one drilling rig. If there is more than one, drilling can proceed with the rigs working in part simultaneously in time, so that drilling operations in multiple wells can overlap in time.

The start date of the given schedule is not necessarily dependent on event(s) in another schedule. For example, the user may enter an explicit start date for the given schedule. Alternatively, the user may specify that the start date of the given schedule be X days after the project start date. X may be a user-specified constant or a variable whose uncertainty is specified by the user as variously described above.

A schedule may be dependent on multiple other schedules. For example, the user may specify a compound constraint such as "the given schedule starts X days after the start of schedule A and Y days after the start of production in schedule B", where X and Y are user-defined constants or variables whose uncertainty is specified by the user as variously described above.

In some embodiments, the schedule configuration tool may be configured to support the modeling of multiple tasks within the completion process. For example, the completion process itself may include multiple tasks such as setting packers, installing valves, cementing, fracturing, perforating, etc.

In some embodiments, the user may specify a common production start date and/or a common injection start date. The common production start date (injection start date) places a constraint on the production (injection) start date of each production (injection) well in each schedule in the global project. In other words, no production well may start production before the common production start date. Similarly, no injection well may start injection before the common injection start date. The GUI of the asset assigner may include input fields for entering a common production start date and a common injection start date.

As described above, the schedule configuration tool allows the user to specify the uncertainty associated with the drilling time duration. Alternatively, the schedule configuration tool may support a mode, selectable by the user, in which the drilling time duration for each well is determined by a drilling time estimate provided by the asset planning tool.

Schedule Resolver

As described above, the schedule resolver operates as part of an iterative process. In each iteration of the iterative process, an instantiation module may generate instantiated values of the schedule variables in each schedule of the global project and instantiated values of the dependency variables, and the schedule resolver may resolve the events dates within each schedule based on the instantiated values.

To generate an instantiated value for a random variable X, a processor may execute a random number algorithm to determine a random number $\alpha$ in the closed interval $[0,1]$, and compute a quantile of order $\alpha$ based on the PDF and/or the discrete set of probabilities corresponding to the random variable X. The computed quantile is taken to be the instantiated value for the random variable X. The process of generating the quantile for a random variable X based on the randomly generated number $\alpha$ is called random instantiation.

A quantile of order $\alpha$ for a random variable X is a value Q satisfying the constraints:

$$\text{Probability}(X \leq Q) \geq \alpha \text{ and}$$

$$\text{Probability}(X \geq Q) \geq 1-\alpha.$$

For a random variable having a continuous cumulative probability distribution, the quantile constraints may simplify to the single constraint:

$$\text{Probability}(X \leq Q) = \alpha.$$

Resolution of event dates may proceed forward in time from the project start date, or, in one alternative embodiment, backwards in time from a project end date. Furthermore, date resolution respects (1) the user-defined temporal ordering of wells and facilities, (2) the user-defined constraints on event dates, and (3) system-defined global constraints such as the constraint that production from (or injection to) a well cannot start before the facility with which it is connected has finished establishment (or a certain phase of establishment). Date resolution also respects any common start dates specified by the user such as common production start date or common injection start date. Event dates include dates such as schedule start and end dates, well drilling start and end dates, well completion start and end dates, well production (or injection) start dates, facility establishment start and end dates, and so on. The set of schedules generated in each iteration of the iterative process may be interpreted as an instantiation of a random global project schedule.

If a schedule's start date depends on one or more other schedules, the schedule's start date is calculated from the resolved event date(s) of the other schedule(s) and the instantiated dependency delay time(s). If the schedule is not dependent on another schedule, the schedule start date may be set equal to a user-specified date or calculated based on an instantiated delay from a user-specified date (e.g., the project start date).

For each well associated with a schedule, the drilling process start and end dates, the completion start and end dates, and the production (or injection) start date may be calculated based on the resolved schedule start date, the user-specified well ordering, and instantiated schedule variables such as instantiated drilling time, instantiated completion time, instantiated post-drilling delay. For each facility associated with a schedule, the facility establishment process start and end dates may be calculated based on the resolved schedule start date, any user-specified ordering of facilities, and instantiated schedule variables such as instantiated facility establishment time. Dates associated with wells and facilities are ordered based on the orderings specified (or selected) by the user for that schedule. Production start dates for a well do not precede the establishment end date of the facility to which the well is connected. The production start date for each well may be set equal to the latest of the well's completion end date, the common production start date, and the establishment end date of the associated facility (or facilities).

The schedule resolver respects the following rules when the schedules are instantiated in each iteration of the iterative process:
 (a) user-specified dependencies between schedules (such as schedule start dependencies and production start dependencies) are not violated;
 (b) user-specified constraints (such as well and facility ordering and mode selections) within a schedule are not violated;
 (c) wells are not allowed to produce or inject before their associated facility has been established (i.e., has reached its establishment end date);
 (d) production wells are not allowed to start production before the common production start date (if a common production start date has been specified);
 (3) injection wells are not allowed to start injection before the common injection start date (if a common injection start date has been specified).

The schedule resolver may format the resolved dates from the instantiated schedules of the global project for subsequent processing by a reservoir flow simulator and/or an economic computation engine. The resolved production or injection start dates for all wells of all schedules may be ordered in increasing date order and appended to an input data set $D_F$ for the reservoir flow simulator. For each well, the resolved values of the drilling start and end dates, and the completion start and end dates may be appended to an input data set $D_E$ for the economic computation engine. For each scheduled facility, the resolved values of the facility establishment start and end dates may also be appended to the input data set $D_E$ for the economic computation engine.

The schedule configuration tool may be configured to accept production (or injection) constraints for the wells with the production (or injection) start dates. The constraints may be specified by the asset planning tool, or, in one alternative embodiment, by the user. Examples of constraints are maximum water production, minimum well flow pressure, and maximum gas-to-oil ratio. The schedule resolver may append these constraints to the input data set $D_F$ for the reservoir flow simulator. The reservoir flow simulator may use these constraints to realistically mimic field conditions.

Some of the wells and facilities specified by the user may represent existing (physical) wells and facilities. For example, there may be existing production wells which the user may want to shut in and then change a completion or perforation; or there may be existing facilities from which the user may want to schedule the drilling of new wells.

FIG. 6 illustrates an example of event date resolution for a schedule including one facility and two associated wells. In this example, it is assumed that two drilling rigs are available at the schedule start date $T_{Start}$. Thus, the drilling of the two wells may proceed in parallel. Furthermore, this example assumes that the user has specified the "after-each" mode for well completion. The values $drill_1$ and $drill_2$ are instantiated values of the well drilling time for the first well and second well respectively. The values $pdd_1$ and $pdd_2$ are instantiated values of post-drilling delay for the first well and second well respectively. The values $complete_1$ and $complete_2$ are instantiated values of the well completion time for the first well and second well respectively. The value FET is an instantiated value of the facility establishment time.

The dates $A_1$, $A_2$ and $A_3$ are the drill end date, completion start date and completion end date, respectively, for the first well. The dates $A_4$, $A_5$ and $A_6$ are the drill end date, completion start date and completion end date, respectively, for the second well. The production (or injection) start date for the second well may be set equal to its completion end date $A_6$. However, the production (or injection) start date for the first well may be set equal to the end date $A_7$ of facility establishment as this later date occurs after the completion end date $A_3$ of the first well.

Figure 7:
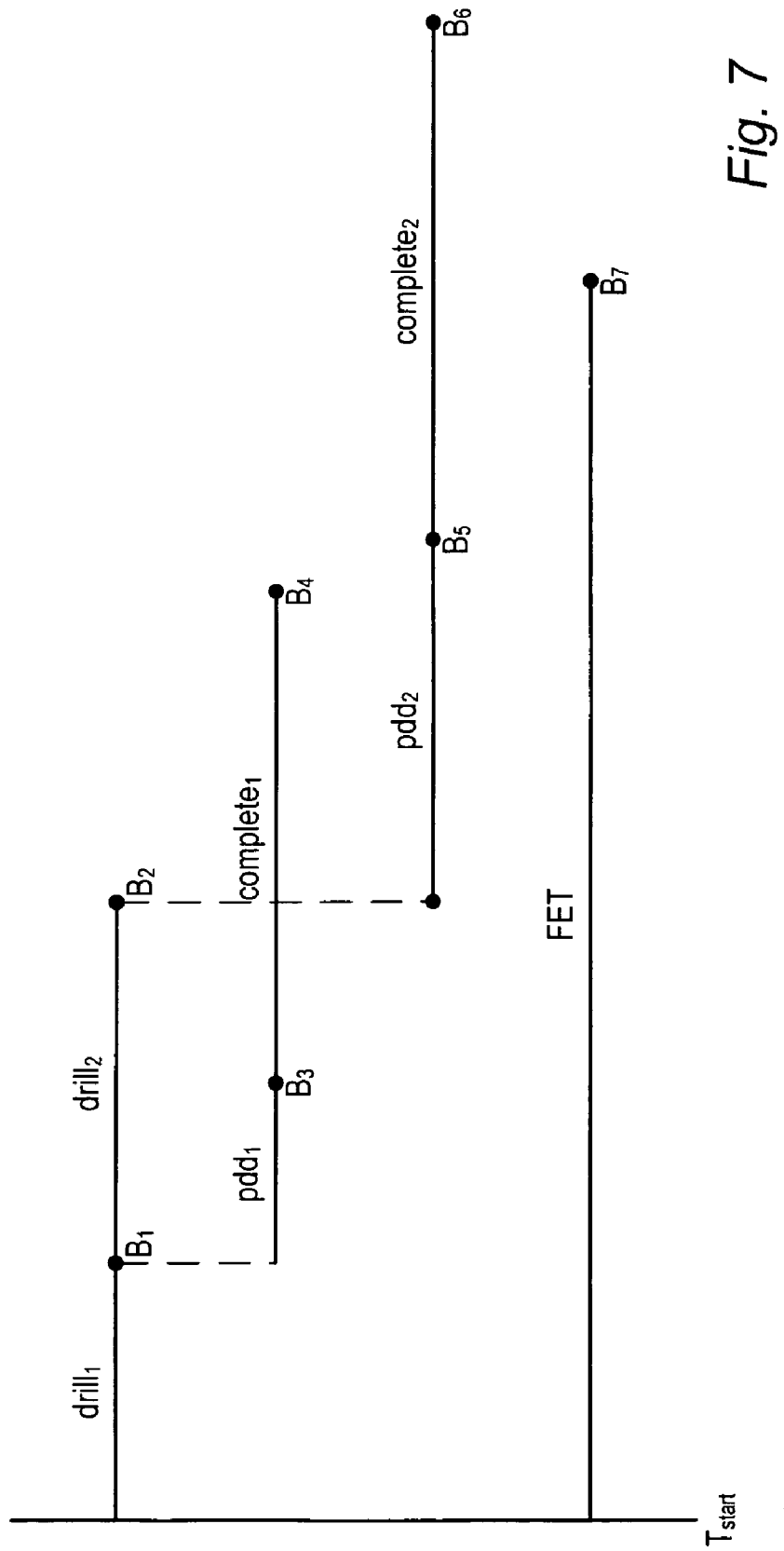
FIG. 7 illustrates an example of event date resolution for a schedule including one facility and two associated wells, where the wells are drilled sequentially.

FIG. 7 illustrates another example of event date resolution for a schedule including one facility and two associated wells. In this example, it is assumed that only one drilling rig is available. Thus, the wells are drilled sequentially. Furthermore, this example assume that the user has specified the "after each" mode of well completion. The values $drill_1$ and $drill_2$ are instantiated values of the well drilling time for the first well and second well respectively. The values $pdd_1$ and $pdd_2$ are instantiated values of post-drilling delay for the first well and second well respectively. The values $complete_1$ and $complete_2$ are instantiated values of the well completion time for the first well and second well respectively. The value FET is an instantiated value of the facility establishment time.

The date $B_1$ is the drill end date for the first well, the drill start date for the second well, and the start date for the post-drilling delay period for the first well. The date $B_2$ is the drill end date for the second well and the start date for the post-drilling delay period for the second well. The dates $B_3$ and $B_4$ are start and end dates respectively for the completion of the first well. The dates $B_5$ and $B_6$ are the start and end dates respectively for the completion of the second well. The date $B_7$ is the end date for the establishment of the facility. The production start date for the second well may be set equal to the completion end date $B_6$ of the second well (as this completion end date occurs after the facility establishment end date $B_7$). However, the production start date for the first well may be set equal to the facility establishment date $B_7$ (as the facility establishment end date $B_7$ occurs after the completion end date $B_4$ of the first well).

Figure 8:
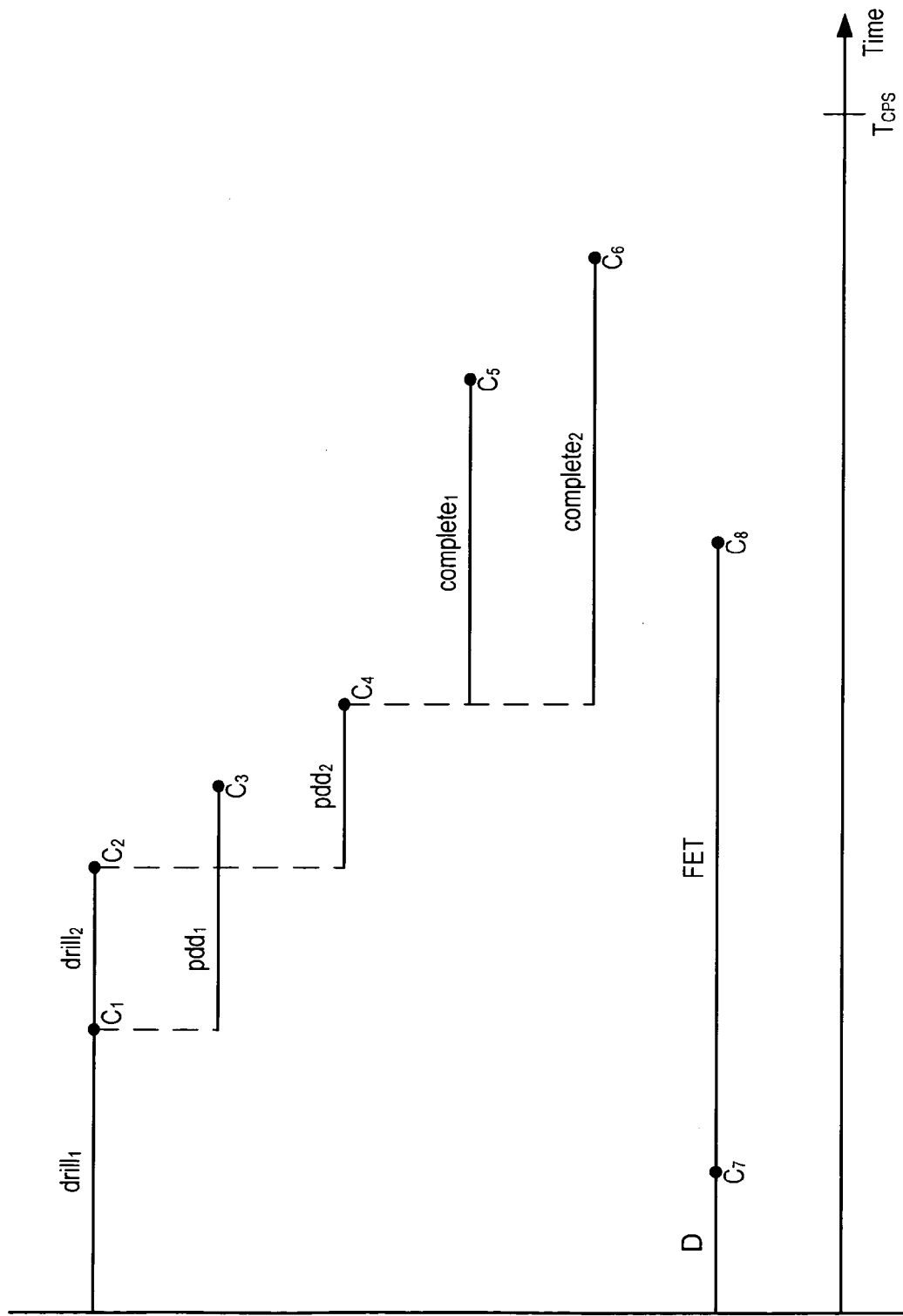
FIG. 8 illustrates an example of event date resolution for a schedule including one facility and two associated wells in an "after all" mode of completion.

FIG. 8 illustrates yet another example of event date resolution for a schedule including one facility and two associated production wells. The wells are drilled sequentially and completed in parallel. This example assumes that the user has specified the "after all" mode for well completion. The values $drill_1$ and $drill_2$ are instantiated values of the well drilling time for the first well and second well respectively. The values $pdd_1$ and $pdd_2$ are instantiated values of post-drilling delay for the first well and second well respectively. The values $complete_1$ and $complete_2$ are instantiated values of the well completion time for the first well and second well respectively. The value FET is an instantiated value of the facility establishment time. The value $\Delta$ is an instantiated value of a delay time that precedes facility establishment.

The dates $C_1$ and $C_2$ are the end dates for drilling the first well and second well respectively. The dates $C_3$ and $C_4$ are end dates for the post-drilling delay period of the first well and second well respectively. The completion of both wells starts at the latest of the end dates of the post-drilling delay periods, i.e., in this case at date $C_4$. The dates $C_5$ and $C_6$ are the end dates for completion of the first well and second well respectively. Date $C_7$ is the end date of the delay period defined by $\Delta$ and the start date of facility establishment. Date $C_8$ is the end date of facility establishment. The date $T_{CPS}$ is a user-specified common production start date. Because the common production start date occurs after the facility establishment end date and the well completion end dates, the production start dates of the wells are set equal to the common production start date.

Figure 9:
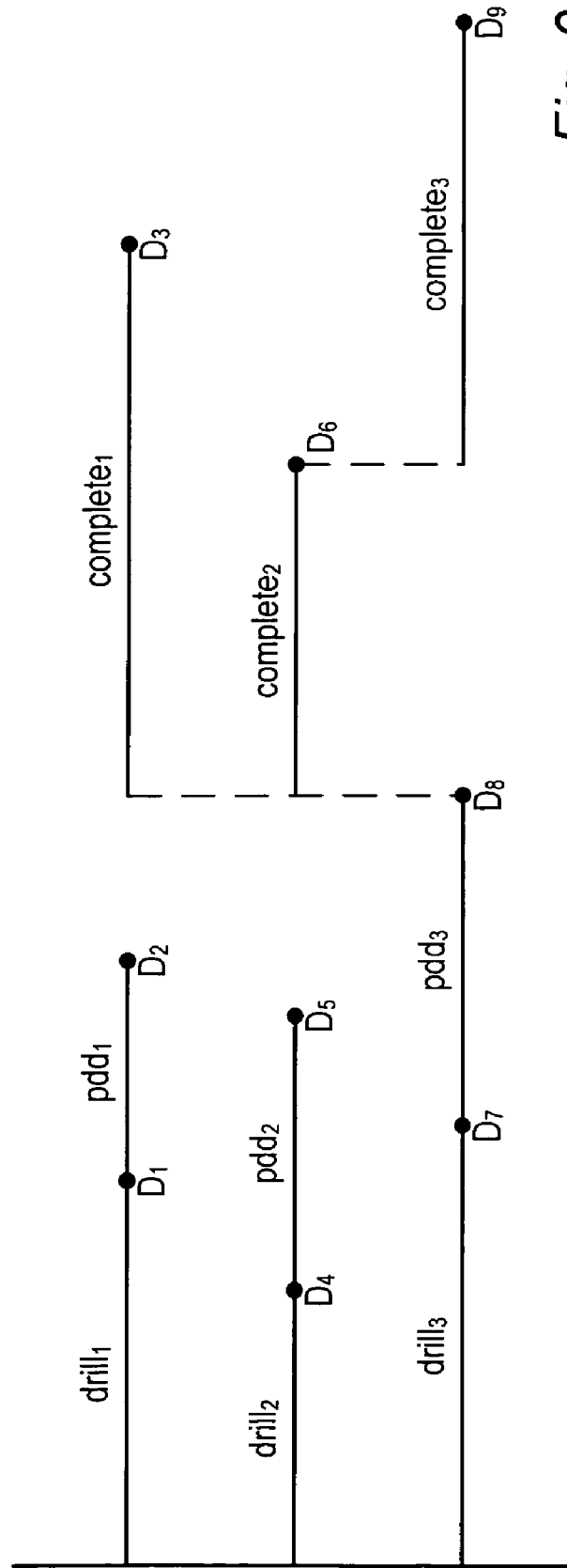
FIG. 9 illustrates an example of event date resolution for a schedule including one facility and three associated wells in an "after all" mode of completion.

FIG. 9 illustrates yet another example of event date resolution for a schedule including one facility and three associated wells. In this example, it is assumed that there are three drilling rigs available at the schedule start date $T_{Start}$ and that there are two completion rigs available when the latest of the three wells finishes its post-drilling delay period. Furthermore, this example assumes that the user has specified the "after all" mode for well completion. The values $drill_1$, $drill_2$ and $drill_3$ are instantiated values of the well drilling time for the first, second and third well respectively. The values $pdd_1$, $pdd_2$ and $pdd_3$ are instantiated values of post-drilling delay for the first, second and third well respectively. The values $complete_1$, $complete_2$ and $complete_3$ are instantiated values of the well completion time for the first, second and third well respectively. Dates $D_1$, $D_4$ and $D_7$ are the drilling end dates for the first, second and third wells respectively. The dates $D_2$, $D_5$ and $D_8$ are the end dates for the post-drilling delay period of the first, second and third wells respectively. The dates $D_3$, $D_6$ and $D_9$ are the completion end dates for the first, second and third wells respectively.

The well completions start at the latest of the end dates of the post-drilling delay periods, i.e., at date $D_8$ in this example. As there are two completion rigs available, the first and second wells are completed in parallel at least initially. At the earliest completion end date, in this example at date $D_6$, one of the completion rigs becomes available for the completion of the third well. Thus, starting at date $D_6$ the first well and third well are completed in parallel at least for some period of time.

In one set of embodiments, the production (or injection) start date for each well may be set equal to the latest of the well's completion end date, the establishment end date of the associated facility, and the common production start date.

Alternative Modes of Instantiation

In one set of embodiments, the instantiation module may be configured to operate in one or more random modes and one or more non-random modes. In the random modes, the instantiation module generates instantiated values of variables randomly based on user defined PDFs or discrete probability distributions. In the non-random modes, variables may be assigned sets of attainable values instead of PDFs (or probability distributions). Examples of non-random modes include a discrete combinations mode and a sensitivity analysis mode.

In the discrete combinations mode, the iterative process may step exhaustively through all possible states in the Cartesian product of the assigned sets. In the sensitivity analysis mode, the iterative process may explore along linear paths in the Cartesian product by varying one variable at a time through its set of attainable values while maintaining all other variables constant. The discrete combinations mode and the sensitivity analysis mode are described at length later in this specification.

Graphical Assembly of Global Schedule

In one set of embodiments, a schedule assembly system may provide a graphical user interface which allows the user to graphically define a system of schedules and constraints between schedules by selecting nodes and creating links between the nodes. The nodes may correspond to events in time (such as project start or end dates, fixed calendar dates, schedule start and end dates, well drilling start and end dates, well completion start and end dates, well production or injection start dates, facility establishment start and end dates and so on), and the links may represent schedules or time delays between schedules (or events).

Figure 10:
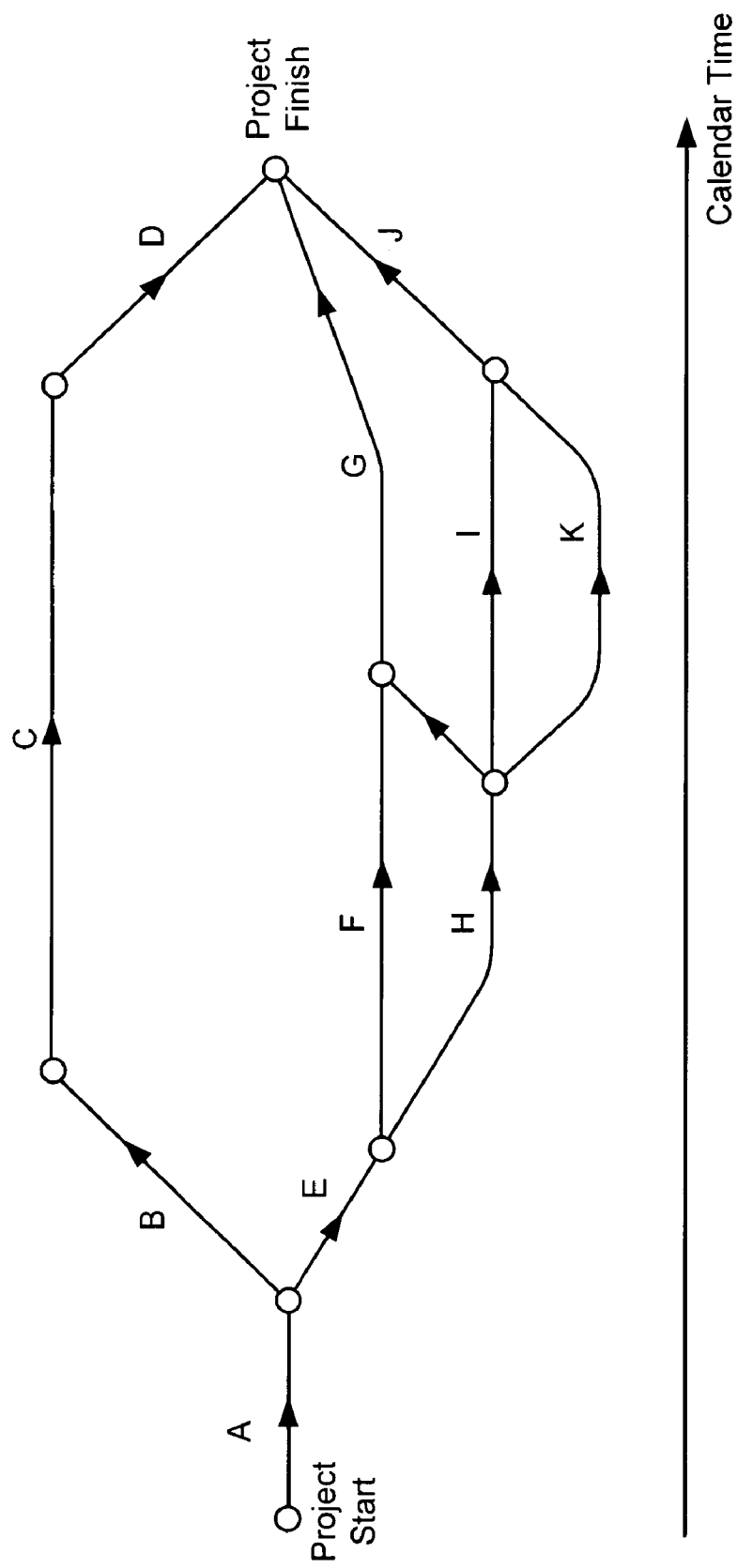
FIG. 10 illustrates one embodiment of a graphical method for generating a global schedule comprising nodes and links.

The user may construct the global schedule by defining schedules and their interdependencies via the GUI of the schedule assembly system. Thus, the global schedule may have an arbitrary topology. FIG. 10 illustrates a global schedule including links A through K. Each link may represent a schedule or a time delay. Observe that a plurality of schedules may run concurrently or in parallel.

Schedule Manager

In some embodiments, a schedule manager program may support a graphical user interface through which a user (or a set of users) may view and delete schedules. The schedule manager presents summary information about the set of component schedules in the global schedule.

The schedule manager may display the number of facilities and the number of wells associated with each schedule. Furthermore, the schedule manager may display an estimated start date, an estimated end date and an estimated production start date for each schedule. If the start date of a schedule depends on the occurrence of an event from another schedule, this schedule start dependency may be indicated. If the production start date of a schedule depends on the occurrence of an event from another schedule, this production start dependency may also be indicated.

Uncertainty Analysis for a Petroleum E&P Project

There are many uncertainties associated with the planning of a petroleum exploration and production (E&P) project. Many physical parameters such as rock permeability, initial fluid pressures and initial saturations are known only to within ranges of values. Often economic parameters such as future tax rates, royalty rates and inflation rates are difficult to predict with accuracy. Many decisions involved in the planning process may have multiple alternative choices (or options or scenarios). For example, a geophysical analysis of a given reservoir may produce a collection of alternative geocellular reservoir models representing different sets of physical assumptions. It is difficult to know which set of physical assumptions is most valid. Similarly, there may be uncertainty associated with choices of well placement, drainage strategy (with or without injection), scheduling of drilling operations, etc.

Figure 11:
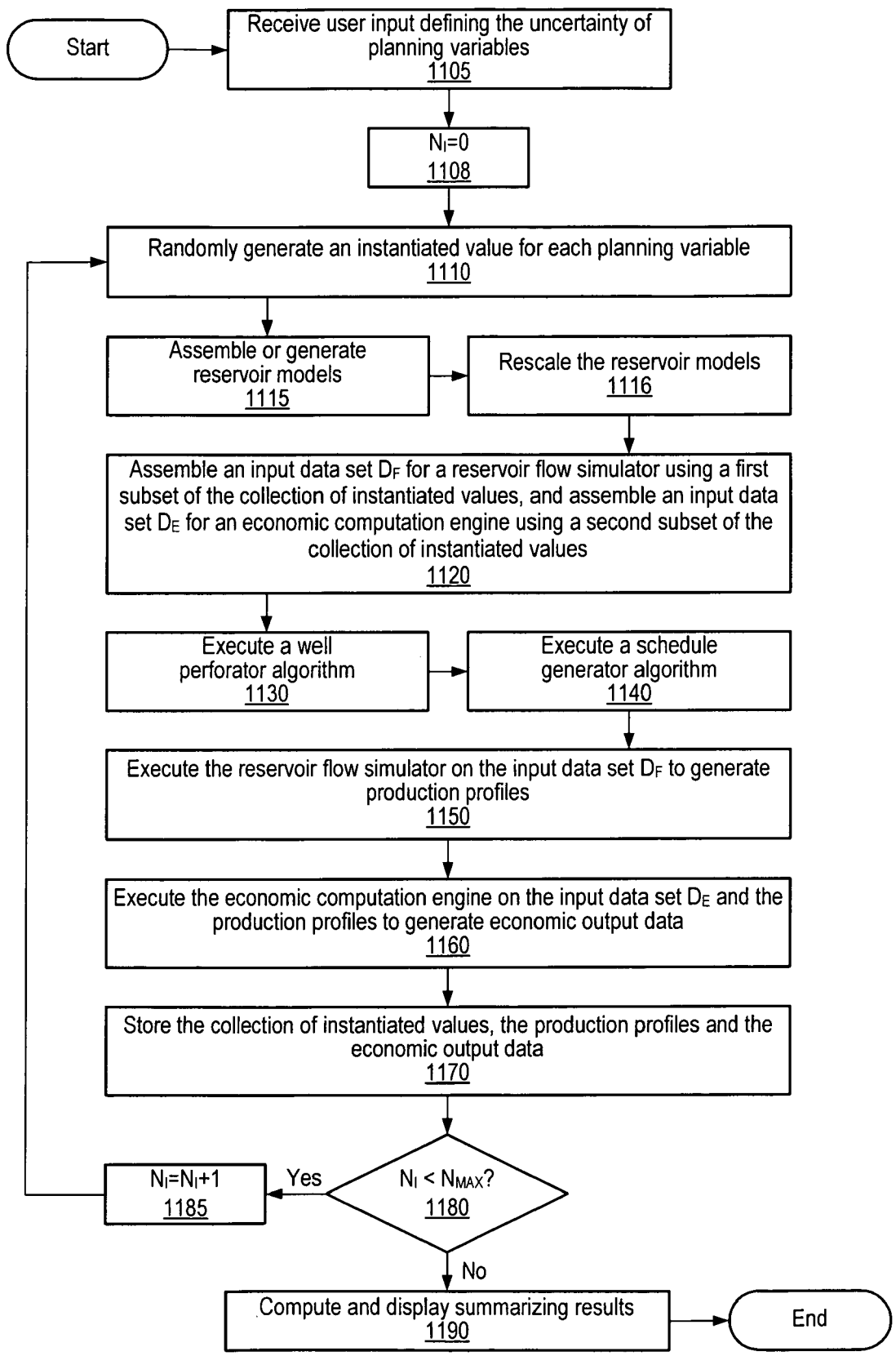
FIG. 11 illustrates one set of embodiments of a computational method operating in a random mode.

In one set of embodiments, a computational method for computing and displaying the economic impact of uncertainties associated with the planning of a petroleum production project may be arranged as indicated in FIG. 11. This computational method will be referred to henceforth as the economic impact visualization (EIV) method. The EIV method may be implemented by the execution of program code on a processor (or a set of one or more processors). Thus, the EIV method will be described in terms of actions taken by the processor (or set of processors) in response to execution of the program code. The processor is part of a computer system including a memory system, input devices and output devices.

The EIV method operates on planning variables. Planning variables may include both controllable parameters and uncontrollable parameters as defined above in the related art section. For example, reservoir physical characteristics, oil prices, inflations rates are uncontrollable parameters, and injection rates for wells are typically controllable parameters. A planning variable that is a controllable parameter is referred to herein as a decision variable.

In step 1105, the processor may provide a system of one or more graphical user interfaces $F_G$ through which the user may define the uncertainty associated with each planning variable. The user may define the uncertainty of a planning variable X in a number of ways. For example, the user may select a probability density function (PDF) from a displayed list of standard probability density functions, and enter PDF characterizing values for the selected PDF. The nature of the PDF characterizing values may depend on the selected PDF. A normal PDF may be characterized by its mean and standard deviation. A uniform PDF defined on the interval [A,B] is more easily characterized in terms of the values A and B. A triangular density function defined on the interval [A,B] with maximum at X=C is more easily characterized in terms of the values A, B and C. The list of standard PDFs may include PDFs for normal, log normal, uniform and triangular random variables.

As an alternative, the user may define the uncertainty of a planning variable X by specifying a histogram for the parameter X. In particular, the user may specify values A and B defining an interval [A,B] of the real line, a number $N_C$ of subintervals of the interval [A,B], and a list of $N_C$ cell population values. Each cell population value may correspond to one of the $N_C$ subintervals of the interval [A,B].

As yet another alternative, the user may define the uncertainty of a planning variable X by specifying a finite list of values $X_1, X_2, X_3, \ldots, X_N$ attainable by the parameter X and a corresponding list of positive values $V_1, V_2, V_3, \ldots, V_N$. The processor may compute a sum $S_V$ of the values $V_1, V_2, V_3, \ldots, V_N$, and generate probability values $P_1, P_2, P_3, \ldots, P_N$ according to the relation $P_K=V_K/S_V$. The probability $P_K$ is interpreted as the probability that $X=X_K$. A parameter that is constrained to take values in a finite set is referred to herein as a discrete parameter.

As yet another alternative, the user may define the uncertainty of a planning variable X by specifying a finite set of realizations $R_1, R_2, R_3, \ldots, R_N$ for the planning variable. For example, the user may specify a finite list of geocellular reservoir models by entering their file names. The user may define the uncertainty associated with the planning variable X by entering a set of positive weights $V_1, V_2, V_3, \ldots, V_N$. The processor may compute a sum $S_V$ of the weights $V_1, V_2, V_3, \ldots, V_N$, and generate probability values $P_1, P_2, P_3, \ldots, P_N$ according to the relation $P_K=V_K/S_V$. The probability $P_K$ is interpreted as the probability that $X=R_K$. The realizations of the planning variable may also be referred to herein as "options" or "scenarios" or "outcomes".

The planning variables may be interpreted as random variables by virtue of the user-specified PDFs and/or discrete sets of probability values associated with them. As suggested by the examples above, each planning variable X has an associated space $S_X$ in which it may take values. The space $S_X$ may be a discrete set of values, the entire real line, or an interval of the real line (e.g., a finite interval or a half-infinite interval), or a subset of an $N_X$-dimensional space, where $N_X$ is a positive integer. The space $S_X$ may be defined by the user. Let $G_P$ represent the global parameter space defined by the Cartesian product of the spaces $S_X$ corresponding to the planning variables. The processor may enact a Monte Carlo simulation by performing steps 1110 through 1170 (to be described below) repeatedly until a termination condition is achieved. The Monte Carlo simulation randomly explores the global parameter space $G_P$.

In some embodiments, the graphical user interfaces $F_G$ may allow the user to supply correlation information. The correlation information may specify the cross correlation between pairs of the planning variables.

In step 1108, the processor may initialize an iteration count $N_1$. For example, the iteration count $N_1$ may be initialized to zero.

In step 1110, the processor may randomly generate an instantiated value for each planning variable X based on its corresponding PDF or discrete set of probabilities. In other words, the processor randomly selects a value for the planning variable X from its space $S_X$ based on the corresponding PDF or discrete set of probabilities. In those embodiments where correlation information is collected, the instantiated values are generated in a manner that respects the specified cross correlations between planning variables.

To generate an instantiated value for a planning variable X, the processor may execute a random number algorithm to determine a random number $\alpha$ in the closed interval $[0,1]$, and compute a quantile of order $\alpha$ based on the PDF and/or the discrete set of probabilities corresponding to the planning variable X as described above.

Recall that the realizations $R_1, R_2, \ldots, R_N$ of a planning variable are not required to be numeric values. Thus, to carry out the instantiation procedure described above, the processor may interpret the probabilities $P_1, P_2, \ldots, P_N$ of the planning variable as the probabilities of a discrete random variable Y on the set $S_Y=\{1, 2, \ldots, N\}$ or any set of N distinct numerical values. The processor randomly generates an instantiated value J of the discrete variable Y. The instantiated value J determines the selection of realization $R_J$ for the planning variable.

In step 1115, the processor may assemble or generate a set $M_{GR}$ of geocellular reservoir models (e.g., a set of geocellular reservoir models determined by one or more of the instantiated values).

In step 1116, the processor may operate on one or more of the geocellular reservoir models of the set $M_{GR}$ in order to generate one or more new geocellular reservoir models scaled through a process of coarsening to a lower, target resolution (or set of target resolutions). These new geocellular models may be used as input to the reservoir flow simulator instead of the corresponding models of the set $M_{GR}$. The coarsening process may be used to scale geocellular models down to a lower resolution to decrease the execution time per iteration of the iteration loop.

In one alternative embodiment, the scaling of geocellular reservoir models to a target resolution (or set of target resolutions) may occur prior to execution of the iteration loop, i.e., prior to instantiation step 1110. In this alternative embodiment, step 1116 as described above may be omitted and step 1115 may be reinterpreted as an assembly of the scaled geocellular reservoir models.

In step 1120, the processor may assemble an input data set $D_F$ for a reservoir flow simulator using a first subset of the collection of instantiated values, and assemble an input data set $D_E$ for an economic computation engine using a second subset of the collection of instantiated values. The first and second subsets are not necessarily disjoint. The instantiated values may be used in various ways to perform the assembly of the input data sets. For example, some of the instantiated values may be directly incorporated into one or both of the input data sets. (Recall that an instantiated value of a planning variable may be a data structure, e.g., a geocellular reservoir model, a reservoir characteristics model, a set of well plans, etc.). Others of the instantiated values may not be directly incorporated, but may be used to compute input values that are directly incorporated into one or both of the input data sets.

In step 1130, the processor may supply well plan information per well to a well perforator and invoke execution of the well perforator. The well perforator may compute one or more perforation locations along each well plan. The well perforation locations per well may be appended to the input data set $D_F$.

In step 1140, the processor may supply instantiated values for parameters such as (a) well drilling time and well completion time per well or group of wells and (b) facility establishment time per facility to a schedule resolver, and invoke execution of a schedule resolver. The schedule resolver computes schedules defining significant dates such as production start date per well, drilling start date and end date per well, completion start date and end date per well, start and end dates of facility establishment per facility, and so on. The schedules may be appended to the input data set $D_F$ and the input data set $D_E$.

In step 1150, the processor may supply the input data set $D_F$ to the reservoir flow simulator and invoke execution of the reservoir flow simulator. The reservoir flow simulator may generate production profiles of oil, gas and water for wells and/or facilities defined by the input data set $D_F$. The reservoir flow simulator may have any of various forms, including but not limited to a finite difference simulator, a material balance simulator, or a streamline simulator.

In step 1160, the processor may supply the production profiles (generated by the reservoir simulator) and the input data set $D_E$ to the economic computation engine. The economic computation engine computes economic output data based on the production profiles and the input data set $D_E$. The economic output data may include a stream of investments and returns over time. The economic output data may also include a net present profit value summarizing the present effect of the stream of investments and returns.

In step 1170, the processor may store (or command the storage of) an iteration data set including (a) the collection of instantiated values generated in step 1110, (b) the production profiles generated by the reservoir flow simulator, and (c) the economic output data onto a memory medium (e.g., a memory medium such as magnetic disk, magnetic tape, bubble memory, semiconductor RAM, or any combination thereof). The iteration data set may be stored in a format usable by a relational database such as Open DataBase Connectivity (ODBC) format or Java DataBase Connectivity (JDBC) format.

In step 1180, the processor may determine if the iteration count $N_1$ is less than an iteration limit $N_{MAX}$. The user may specify the iteration limit $N_{MAX}$ during a preliminary setup phase. If the iteration count $N_1$ is less than the iteration limit, the processor may continue with step 1185. In step 1185, the processor may increment the iteration count $N_1$. After step 1185, the processor may return to step 1110 for another iteration of steps 1110 through 1170.

If the iteration count $N_1$ is not less than the iteration limit, the processor may continue with step 1190. In step 1190, the processor may perform computations on the iteration data sets stored in the memory medium, and display the results of said computations. For example, the processor may compute and display a histogram of net present value. As another example, the processor may display a collection of graphs, each graph representing economic return versus time for a corresponding iteration of steps 1110 through 1170. The collection of graphs may be superimposed in a common window for ease of comparison.

After the EIV method has concluded, the user may invoke a relational database program to perform analysis of the iteration data sets that have been stored on the memory medium.

In one alternative embodiment of step 1180, the processor may perform a test on the time $T_E$ (e.g., clock time or execution time) elapsed from the start of the EIV method instead of a test on number of iterations. The processor may determine if the elapsed time $T_E$ is less than (or less than or equal to) a limit $T_{MAX}$. The limit $T_{MAX}$ may be specified by the user. In this alternative embodiment, step 1108 may include the act of reading of an initial timestamp $T_0$ from a system clock. In step 1180, the processor may read a current time $T_C$ from the system clock, compute the elapsed time $T_E$ according the relation $T_E=T_C-T_0$, and compare the elapsed time $T_E$ to the time limit $T_{MAX}$.

The EIV method as illustrated in FIG. 11 performs stochastic sampling (i.e., random instantiation) of planning variables, and thus, enacts a Monte Carlo simulation. There are a number of different methods for performing the stochastic sampling, and thus, other embodiments of the EIV method are contemplated which use these different stochastic sampling methods. For example, in one embodiment, the EIV method uses Latin Hypercube sampling Latin Hypercube sampling may be used to obtain samples of a random vector $\xi=[\xi_1, \xi_2, \ldots, \xi_n]$. Let N be the size of the population of samples. The range of each random variable $\xi_k$ may be divided into N non-overlapping intervals having equal probability mass 1/N according to the probability distribution for variable $\xi_k$. A realization for variable $\xi_k$ may be randomly selected from each interval based on the probability distribution of variable $\xi_k$ in that interval. The N realizations of variable $\xi_1$ are randomly paired with the N realizations of $\xi_2$ in a one-to-one fashion to form N pairs. The N pairs are randomly associated with the N realizations of $\xi_3$ in a one-to-one fashion to form N triplets. This process continues until N n-tuples are obtained. The n-tuples are samples of the random vector $\xi$.

Additional information on Latin Hypercube sampling may be found in the following references:

(1) "Controlling Correlations in Latin Hypercube Samples", B. Owen, Journal of the American Statistical Association, volume 89, no. 428, pp. 1517-1522, December 1994;

(2) "Large Sample Properties of Simulations using Latin Hypercube Sampling", M. Stein, Technometrics, volume 29, no. 2, pp. 143-151, May 1987.

These references are hereby incorporated by reference in their entirety.

In some embodiments, the EIV method is configured to operate in a number of alternative modes. The user may select the operational mode. In the Monte Carlo mode (described above in connection with FIG. 11), the processor randomly generates vectors in the global parameter space $G_P$. In a "discrete combinations" mode, the user defines a finite set of attainable values for each planning variable, and the processor exhaustively explores the Cartesian product of the finite sets. In a "sensitivity analysis" mode, the user defines a finite set of attainable values for each planning variable, and the processor explores along linear paths passing through a user-defined base vector in the Cartesian product, each linear path corresponding to the variation of one of the planning variables. Thus, the sensitivity analysis mode allows the user to determine which planning variable has the most influence on net present value and/or economic return.

Figure 12:
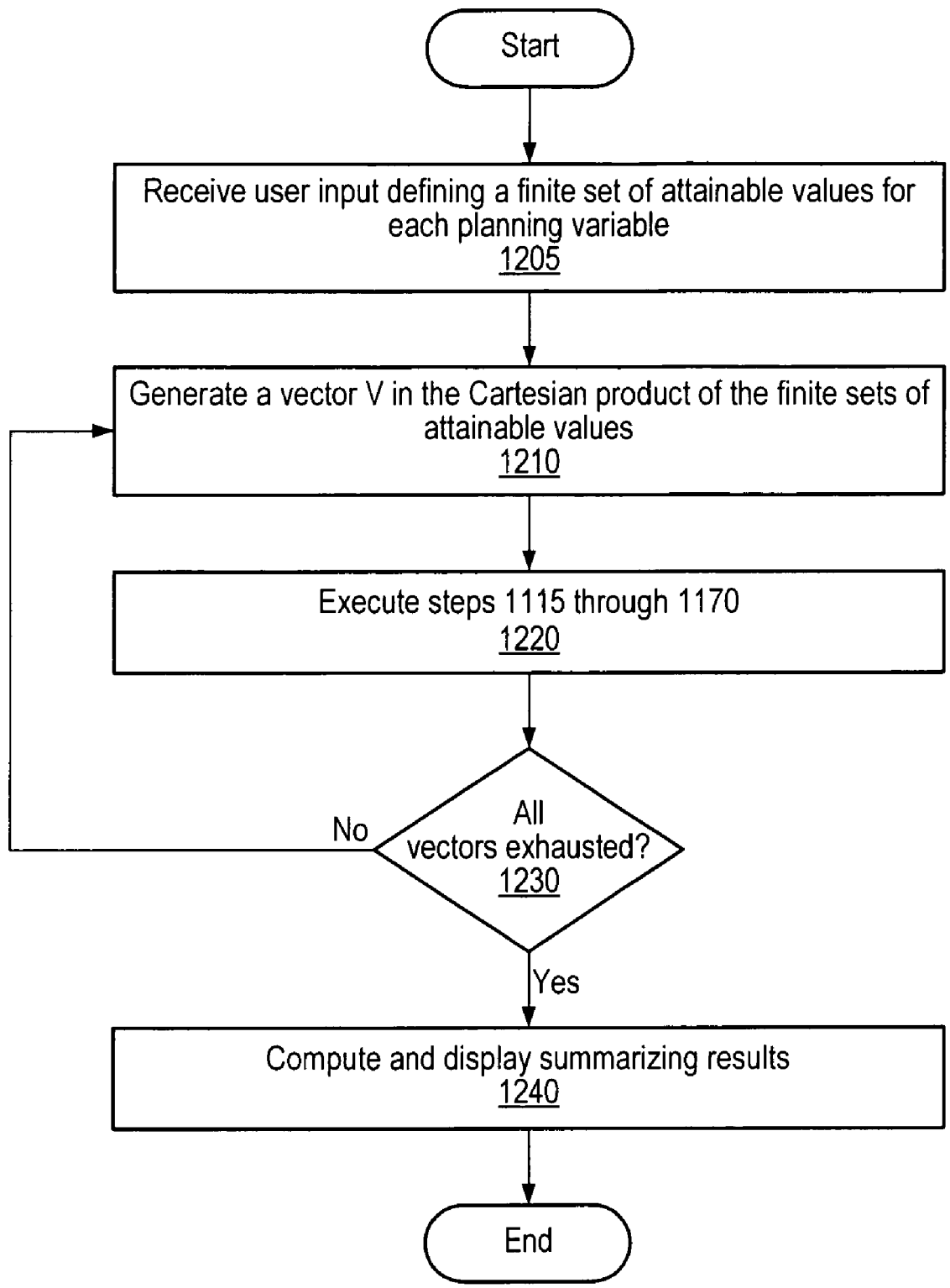
FIG. 12 illustrates another set of embodiments of the computational method operating in a discrete combinations mode.

FIG. 12 illustrates one set of embodiments of the EIV method operating in the discrete combinations mode.

In step 1205, the processor may provide a system of one or more graphical user interfaces through which the user may define a finite set of attainable values (or realizations) for each planning variable. Let $X^1, X^2, X^3, \ldots, X^M$ denote the planning variables. After having performed step 1205, each planning variable $X^J$ will have been assigned a finite set $S_{XJ}$ of attainable values. (Recall that attainable values may be numeric values, or sets of numeric values or data structures.)

Let $P_C$ denote the Cartesian product of the finite sets $S_{XJ}$ for $J=1, 2, \ldots, M$. Let $L_J$ denote the size (number of elements) in finite set $S_{XJ}$. Thus, the Cartesian product $P_C$ has size $N_{DC}=L_1*L_2*\ldots*L_M$. An element of the Cartesian product is a vector of the form $(x^1, x^2, \ldots, x^M)$, where $x^J$ is an attainable value of the planning variable $X^J$.

The user may specify the finite set $S_{XJ}$ of attainable values for a planning variable $X^J$ by entering the values of the finite set $S_{XJ}$ through a keyboard or numeric keypad.

As an alternative, the user may specify the finite set $S_{XJ}$ of attainable values for the planning variable $X^J$ to be a set of quantiles $Q_{T1}, Q_{T2}, \ldots, Q_{TL}$ of a PDF by selecting the PDF from a displayed list of standard PDFs, and entering the numbers T1, T2, ..., TL, e.g., numbers in the interval [0,100]. The notation $Q_T$ denotes the quantile of order T/100 derived from the selected PDF. The numbers T1, T2, ..., TL are referred to herein as quantile specifiers. For example, the user may select a normal PDF and enter the quantile specifiers 15, 50 and 85 to define the finite set $S_{XJ}=\{Q_{15}, Q_{50}, Q_{85}\}$ Instead of entering the quantile specifiers T1, T2, ..., TL, the user may select from a list $L_{QS}$ of standard sets of quantile specifiers, e.g., sets such as {50}, {33.3, 66.7}, {25, 50, 75}, {20, 40, 60, 80}. For example, selection of the specifier set {20, 40, 60, 80} specifies the finite set $S_{XJ}=\{Q_{20}, Q_{40}, Q_{60}, Q_{80}\}$ based on the selected PDF. It may be advantageous to remind the user that the quantile specifiers appearing in the standard sets of the list $L_{QS}$ are indeed specifiers of quantiles. Thus, in some embodiments, the graphical user interface may display a character string of the form "$Q_{T1}, Q_{T2}, \ldots, Q_{TL}$" to indicate each standard set {T1, T2, ..., TL} of the list $L_{QS}$.

As yet another alternative, the user may specify the finite set $S_{XJ}$ of attainable values for the planning variable $X^J$ to be a set of the form $\{A+k(B-A)/N_S: k=0, 1, 2, \ldots, N_S\}$ by (a) entering values A, B and $N_S$. In this case the ($N_S+1$) attainable values are equally spaced through the closed interval [A,B].

In the discrete combinations mode, the processor performs $N_{DC}$ iterations of steps 1115 through 1170 (of FIG. 11), i.e., one iteration for each vector $V=(x^1, x^2, \ldots, x^M)$ in the Cartesian product $P_C$. Thus, in step 1210 the processor generates a vector $V=(x^1, x^2, \ldots, x^M)$ in the Cartesian product $P_C$, where $x^J$ is an attainable value of the planning variable $X^J$.

In step 1220, the processor executes steps 1115 through 1170 described above in connection with FIG. 11. The discussion of steps 1115 through 1170 refers to instantiated values of the planning variables. In the discrete combinations mode, the instantiated values of the planning variables are the values $x^1, x^2, \ldots, x^M$. The planning variables are not interpreted as random variables in the discrete combinations mode.

In step 1230, the processor determines if all vectors in the Cartesian product $P_C$ have been visited. If all vectors in the Cartesian product $P_C$ have not been visited, the processor returns to step 1210 to generate a new vector (i.e., a vector that has not yet been visited) in the Cartesian product $P_C$.

If all the vectors in the Cartesian product $P_C$ have been visited, the processor continues with step 1240. In step 1240, the processor may perform computations on the iteration data sets stored in the memory medium, and display the results of said computations. For example, the processor may compute and display a histogram of net present value. As another example, the processor may display a collection of graphs, each graph representing economic return versus time for a corresponding iteration of steps 1210 and 1220. The collection of graphs may be superimposed in a common window for ease of comparison.

Figure 13:
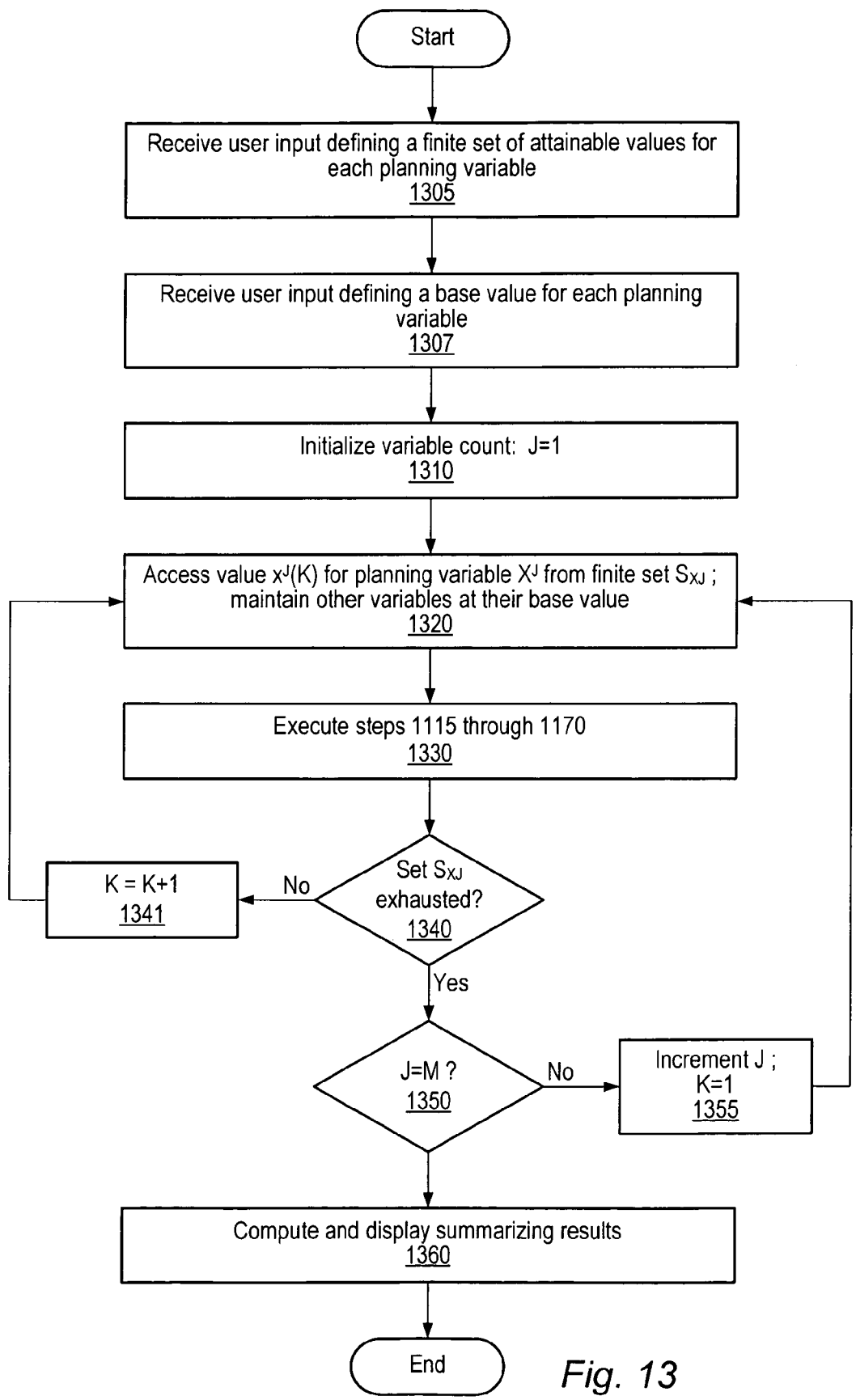
FIG. 13 illustrates yet another set of embodiments of the computational method operating in a sensitivity analysis mode.

FIG. 13 illustrates one set of embodiments of the EIV method operating in the sensitivity analysis mode.

In step 1305, the processor may provide a system of one or more graphical user interfaces through which the user may specify a finite set of attainable values (or realizations) for each planning variable. Let $X^1, X^2, X^3, \ldots, X^M$ denote the planning variables. After having performed step 1305, each planning variable $X^J$ will have been assigned a finite set $S_{XJ}$ of attainable values.

Let $P_C$ denote the Cartesian product of the finite sets $S_{XJ}$ for $J=1, 2, \ldots, M$. Let $L_J$ denote the size (number of elements) in finite set $S_{XJ}$. An element of the Cartesian product is a vector of the form $(x^1, x^2, \ldots, x^M)$, where $x^J$ is an attainable value of the planning variable $X^J$.

In step 1307, the user may specify a base value $B^J$ for each planning variable $X^J$ from the finite set $S_{XJ}$.

In step 1310, the processor may initialize a variable counter J to one.

In step 1320, the processor may access a value $x^J(K)$ for the planning variable $X^J$ from the finite set $S_{XJ}$. All other planning variables $X^I$, $I \neq J$, are maintained at their base values, i.e., $x^I=B^I$. Index K may be initialized (e.g., to one) prior to step 1320.

In step 1330, the processor executes steps 1115 through 1170 described above in connection with FIG. 11. The discussion of steps 1115 through 1170 refers to instantiated values of the planning variables. In the sensitivity analysis mode, the instantiated values of the planning variables are the values $x^1, x^2, \ldots, x^M$.

In step 1340, the processor determines if all the attainable values of the finite set $S_{XJ}$ have been visited. If all the attainable values of the finite set $S_{XJ}$ have not been visited, the processor may increment the index K (as indicated in step 1341) and return to step 1320 to access a next value for the planning variable $X^J$ from the finite set $S_{XJ}$.

If all the attainable values of the finite set $S_{XJ}$ have been visited, the processor may continue with step 1350. In step 1350, the processor may determine if the variable count J equals M. If the variable count J is not equal to M, the processor may increment the variable counter J and reinitialize the index K (as indicated in step 1355) and return to step 1320 to start exploring the next planning variable.

If the variable count J is equal to M (indicating that all the planning variables have been explored), the processor may continue with step 1360. In step 1360, the processor may perform computations on the iteration data sets stored in the memory medium, and display the results of said computations as described above in connection with FIGS. 11 and 12.

The EIV method includes an iteration loop that executes a number of times until a termination criteria is achieved. In FIG. 11, the iteration loop is represented by steps 1110 through 1185.

In FIG. 12, the iteration loop is represented by steps 1210 through 1230. In FIG. 13, the iteration loop is represented by steps 1320 through 1355.

In some embodiments, the processor may operate on the one or more geocellular reservoir models which have been supplied as input in order to generate new geocellular reservoir models scaled to a target resolution (or set of target resolutions). These new geocellular models may be used in the iteration loop instead of the originally supplied geocellular models. The scaling operation may be used to scale geocellular models down to a lower resolution to decrease the execution time per iteration.

In one set of embodiments, a system of software programs may be configured to perform decision analysis and uncertainty evaluation to assist in the planning of a petroleum exploration and production project. The system of software programs may be referred to herein as a decision management system (DMS) as it allows a user to evaluate the economic impact of numerous decision alternatives (e.g., scenarios) and parameter uncertainties associated with a prospect or field. The decision management system integrates the simulation of a value chain including a number of reservoirs, wells, facilities, and couplings between the wells and the facilities. The decision management system may also highlight uncertainties and risks to capital investment.

The decision management system may include a controller program and a collection of supporting programs. The controller program and the supporting programs may execute on a set of one or more processors, e.g., on processor 102 of FIG. 1. The controller program may direct the execution of the EIV method as described variously above in connection with FIGS. 11-13. The supporting programs may include the following programs.

Supporting Programs (1) A model manager provides an interface through which the user may establish the source locations (in the memory system of a computer or computer network) for models. The models include data structures that represent components of the value chain and data structures associated with components of the value chain. For example, the models may include geocellular models for reservoirs, models of the physical characteristics of reservoirs, well location and well plan models, well drilling schedules, well production schedules, models for the establishment of facilities, models of capital investment expenses, models of operating expenses, and fiscal regime models.

In some embodiments, the user may specify the source locations of models generated by a well and facility asset planning tool such as the DecisionSpace AssetPlanner™ produced by Landmark Graphics.

Any of various types of geocellular models may be supported. Furthermore, a wide of range of geocellular model resolutions may be supported. For example, in one set of embodiments, the model manager may support geocellular models ranging from high-resolution models having hundreds of thousands of cells to low-resolution models having tens (or less) of cells. High-resolution models constructed by rigorous geologic and geophysical procedures may also be supported.

The model manager interface may also allow the user to manage the models.

(2) A case generator provides an interface through which the user may assemble a case by selecting models (or groups of models) from the set of models established via the model manager. For example, the user may form a case by selecting a geocellular reservoir model, a reservoir characteristics model, a set of well location and well plan models, a set of well drilling schedules, and a set of a well production schedules. The selected models may include planning variables. Thus, the case generator interface may allow the user to specify the randomness (or the set of attainable values) associated with any planning variables corresponding to the selected models.

The user may be interested in constructing planning variables from models in order to explore the implications of various alternative scenarios. (See the discussion of planning variables presented above in connection with FIGS. 11-13.) Thus, the case generator interface allows the user to define a planning variable by selecting models (from the set of models established through the model manager) as realizations of the planning variable. For example, the user may select two or more geocellular models for a given reservoir as realizations of a first planning variable; and select two or more well production schedules for a given well (or group of wells) as realizations of a second planning variable. If the user wishes to have a planning variable treated as a random construct, the user may additionally specify probabilities values (or positive numeric values which are subsequently scaled to probability values) corresponding to the realizations of the planning variable.

Models and planning variables may themselves be assembled to form higher-order planning variables. Thus, the present invention contemplates the use of planning variables which represent hierarchical trees of decisions, each decision having a set of alternative outcomes.

The user's interaction with the case generator interface results in the construction of a case. A case may include one or more models and a characterization of the randomness (or set of attainable values) of each planning variable.

Let $M_C$ denote the set of models in a case. A model that is not included as a realization of any planning variable is said to be a noncontingent model. A model that is included as a realization of one or more planning variables is said to be a contingent model.

(3) A reservoir model scaling engine (RMSE) operates on a first geocellular reservoir model having a first resolution to generate a second geocellular reservoir model having a second resolution. The user may specify the second resolution (i.e., the target resolution). The scaling engine may be used to generate a lower resolution geocellular model in order to decrease the execution time of each iteration of steps 1110 through 1170, especially if a large number of iterations is anticipated.

(4) The instantiation module generates a vector $V=(x^1, x^2, x^3, \ldots, x^M)$ in the global parameter space defined by the user, where $x^K$ is a value in the space $S_X$ of planning variable $X^K$. In other words, the instantiation module selects (i.e., instantiates) a particular value for each planning variable from the corresponding space $S_X$.

The instantiation module may operate in a plurality of modes. In a Monte Carlo (random) mode, the instantiation module may generate the vector V randomly using the PDFs (and/or discrete sets of probabilities) defined for the planning variables. See the discussion above connected with step 1110 of FIG. 11. Repeated invocations of the instantiation module generate vectors which randomly explore the global parameter space. In some embodiments, the instantiation module may employ user-specified cross-correlation information to determine the vector V.

In a discrete combinations mode, the instantiation module may generate the vector V according to a scanning process such as the scanning process illustrated by the following pseudo-code.

```
T ←K₁+1;
For J=1 to M {
    if (T>L_J) {
        if (J=M) { terminate iteration ioop };
        else {
            K_J ←1;
            T ←K_{J+1}+1}
    else {
        K_J ←T;
        x^J ←S_{XJ}(K_J);
        return;
    }}
```

The variables $K_1, K_2, \ldots, K_M$ are state variables that keep track of position in the scanning process. Prior to a first invocation of the instantiation module (e.g., during a preliminary setup phase of the controller program), the state variables may each be initialized to one. M is the number of planning variables. The notation $S_{XJ}(K_J)$ denotes the $K_J^{th}$ element of the finite set $S_{XJ}$ of attainable values corresponding to planning variable $X^J$. The parameter $L_J$ denotes the number of elements in the finite set $S_{XJ}$. The global parameter space has $N_{DC}=L_1*L_2* \ldots *L_M$ vector elements. The scanning process illustrated above covers the global parameter space efficiently. In other words, after $N_{DC}$ invocations of the instantiation module, the vector V will have hit each vector element of the global parameter space. The above pseudo-code is not meant to be limiting. A wide variety of alternative forms are contemplated.

In a sensitivity analysis mode, the instantiation module may generate the vector V according to a "move one at a time" process such as that given by the following pseudo-code.

```
T ←K+1
if (T>L_J) {
    if (J=M) {terminate iteration loop };
    else {
        x^J=B^J
        J ←J+1
        K ←1
        x^J ←S_{XJ}(1)
        return
    }
else {
    K ←T;
    x^J ←S_{XJ}(K);
    return;
}}
```

J is a state variable indicating the currently active planning variable $X^J$. J may be initialized to 1 prior to a first invocation of the instantiation module (e.g., in step 1310 of FIG. 13). The value $L_J$ denotes the number of elements in the finite set $S_{XJ}$. The variable K is a state variable that keeps track of a current element in the finite set $S_{XJ}$ of attainable values corresponding to the planning variable $X^J$. M is the number of planning variables. The notation $S_{XJ}(K)$ denotes the $K^{th}$ element of the finite set $S_{XJ}$. Prior to a first invocation of the instantiation module (e.g., in step 1310), the values $x^2, x^3, \ldots, x^M$ may be initialized to the corresponding user-specified base values, i.e., $x^J \leftarrow B^J$, $J=2, 3, \ldots, M$. The value $x^1$ may be initialized to the first element, i.e., $S_{X1}(1)$, of the finite set $S_{X1}$. Repeated invocations of the instantiation module induce movement along paths of the form $(B^1, \ldots, B^{J-1}, S_{XJ}(K), B^{J+1}, \ldots, B^{M-1}, B^M)$, $J=1, 2, \ldots, M$ and $K=1, 2, \ldots, L_J$. The above pseudo-code is not meant to be limiting. A wide variety of alternative forms are contemplated.

In other embodiments, any of various experimental design techniques may be used to generate vectors in the global parameter space for the iterative simulation (i.e., the EIV method).

(5) A workflow manager uses the set $M_C$ of models in the current case and the vector V of instantiated values to assemble an input data set for each of one or more simulation engines (e.g., simulation engines such as the reservoir flow simulator and economic computation engine). Recall that a first subset of the planning variables have models (i.e., the contingent models) as their realizations. A second subset of the planning variables may characterize parameters within the models (i.e., contingent models and non-contingent models). In one set of embodiments, the workflow manager may generate copies of (a) the noncontingent models of the set $M_C$ and (b) the contingent models (i.e., realizations) determined by the instantiated values of the first subset of planning variables, and substitute instantiated values of the second subset of planning variables into the copies, thereby forming instantiated models. The instantiated models may be used to assemble the input data sets for the simulation engines.

(6) A set of one or more simulation engines may be invoked in each iteration of the iterative simulation. The simulation engines may include a reservoir flow simulator and an economic computation engine.

The reservoir flow simulator may operate on a first input data set including a first subset of the instantiated models (e.g., a geocellular reservoir model, a reservoir physical characteristics model, a set of well location and well plan models, and a set of well production schedules) to generate flows of oil, gas, and water and pressures as they change over time within the value chain. The flow simulator may be of several forms, including, but not limited to, a finite difference simulator, a material balance simulator, or a streamline simulator. In some embodiments, the flow simulator is a full-physics finite difference flow simulator with coupled reservoir, well and surface pipeline hydraulic representation.

The economic computation engine may operate on the flow simulator output and a second input data set (including a second subset of the instantiated models, e.g., instantiated models for capital investment expense, operating expense, and fiscal regime) to generate economic output data. The economic computation engine may be implemented in any of various forms. For example, the economic computation engine may be written in any of various programming languages (such as C, C++, jython, or awk). In some embodiments, the economic computation engine may be implemented as a spreadsheet (e.g., an Excel spreadsheet).

(7) A probability manager may be provided to support step 1105 of FIG. 11. The probability manager provides a graphical interface which allows the user to assign a probability density function (or discrete probability distribution or histogram) to a planning variable. The probability manager interface may display a list of standard PDF types such as normal, lognormal, beta, triangle, gamma, exponential and uniform. The user may select from the displayed list to specify a PDF type, and enter PDF characterizing parameters to define a particular PDF within the specified type. Alternatively, the user may define the probability distribution of a planning variable by entering a finite set of values (or realizations) attainable by the planning variable and an associated set of probability values (or positive numeric values which are subsequently normalized to probability values). As yet another alternative, the user may specify a histogram to define the probability distribution of a planning variable.

(8) A Monte Carlo engine randomly generates an instantiated value for a planning variable based on the PDF (or discrete probability distribution) defined for the planning variable. The Monte Carlo engine may be invoked repeatedly by the instantiation module in the Monte Carlo mode. In one set of embodiments, the Monte Carlo engine may execute a random number algorithm to determine a random number a in the closed interval [0,1], and compute a quantile of order a based on the PDF and/or discrete probability distribution corresponding to the planning variable X. The computed quantile is taken to be the instantiated value for the planning variable X. The process of generating the quantile for a planning variable X based on the randomly generated number $\alpha$ is called random instantiation.

(9) A schedule resolver operates on instantiated values of scheduling parameters (such as well drilling time and well completion time, facility establishment time) and generates schedules for the drilling and completion of wells and schedules for the establishment of facilities as variously described herein. The well schedules include production (or injection) start dates per well. The schedule resolver may use information about well plan models and production platform connections.

(10) A well perforator operates on a set of instantiated well plans and a set of instantiated geocellular reservoir models to compute perforation locations for each of the wells. The perforation locations may be appended to the input data set $D_F$ to be supplied to the reservoir flow simulator. The well perforator may be executed in each iteration of the iterative simulation (because each iteration may yield a different set of instantiated well plans and a different set of instantiated geocellular reservoir models).

(11) A run execution manager manages a number of iterations (of the iteration loop of the EIV method). Each iteration may include an execution of the workflow manager, the one or more simulation engines, the instantiation module, the well perforator and the data manager. In the Monte Carlo (random) mode, the instantiation module may repeatedly invoke the Monte Carlo engine.

(12) A data manager collects the instantiated values of the planning variables (i.e., the vector V) generated in an iteration and the data outputs of the simulation engines (e.g., the reservoir flow simulator and the economic computation engine) to form an iteration data set, and stores the iteration data set in memory. The data manager may arrange the data of the iteration data set for storage in a columnar or relational data base access format such as Open DataBase Connectivity (ODBC) format or Java DataBase Connectivity (JDBC) format.

The data manager enables many commonly available graphical and data analysis applications access to the relational data. In various embodiments the output data comprise oil, gas, and water production or injection rates and pressures over time from wells and facilities, capital investments over time, operating expenses over time, and economic metrics such as rate of return and net present value.

Setup Phase & Calculation Phase

In one set of embodiments, the EIV method may include a setup phase and a computational phase. The controller program may implement the EIV method.

(A) Setup Phase (1) User interacts with the model manager interface to establish the source locations of various models.

(2) User interacts with the case generator interface to select models (from among those declared to the model manager) and define planning variables associated with the models, and thereby, to assemble a case. For example, the user may select one or more subsurface reservoir models, well location models, schedule models, cost and fiscal models; characterize the uncertainty (or the attainable value sets $S_X$) of planning variables in any or all of these models, and construct planning variables that represent alternative choices among these models (e.g., among multiple alternative subsurface reservoir models).

(3) Execute the reservoir model scaling engine. The reservoir model scaling engine operates on the one or more geocellular reservoir models associated with the case to generate one or more output models scaled to a target resolution (or to a set of target resolutions). In the iteration loop of the calculation phase (described below) the output models may be used instead of the original geocellular reservoir models. Execution of the reservoir model scaling engine is optional as the original geocellular models may already have appropriate resolutions. In some embodiments, the reservoir model scaling engine may be configured to operate inside the iteration loop (as described above in connection with step 1116) instead of during the setup phase.

(B) Calculation Phase

The calculation phase includes a sequence of one or more iterations. For each of the iterations, the run execution manager spawns a process that invokes the execution of the instantiation module, the well perforator, the schedule resolver, the workflow manager, the simulation engines, and the data manager. In particular, each iteration may include the following steps:

(1) Execute the instantiation module to generate instantiated values of the planning variables. The instantiated values adhere to the constraints specified by the user (e.g., constraints on the attainable values of the planning variables, cross-correlations, etc.). In the Monte Carlo mode, the instantiation module may invoke the Monte Carlo engine repeatedly to compute random quantile values for each planning variable (or a selected subset of the planning variables).

(2) Execute the workflow manager to assemble input data sets for the simulation engines from the instantiated values and the models of the current case. Note that the instantiated value of a planning variable may specify the selection of a model from a group of models.

(3) Execute the well perforator to compute perforation locations in the instantiated well plans.

(4) Execute the schedule resolver to compute well schedules and facility schedules using instantiated scheduling parameters.

(5) Execute the reservoir flow simulation engine.

(6) Execute the economic computation engine.

(7) Execute the data manager.

(8) Repeat steps (1) through (7) until a termination condition is satisfied.

Steps (1) through (8) may be referred to herein as an iteration loop. The iteration loop may be executed a number of times until the termination condition is achieved.

In some embodiments, the supporting programs of the decision management system may include programs such as a schedule manager, an asset assigner, a schedule configuration tool and a schedule resolver to support the stochastic generation of schedules as described variously herein.

Figure 14:
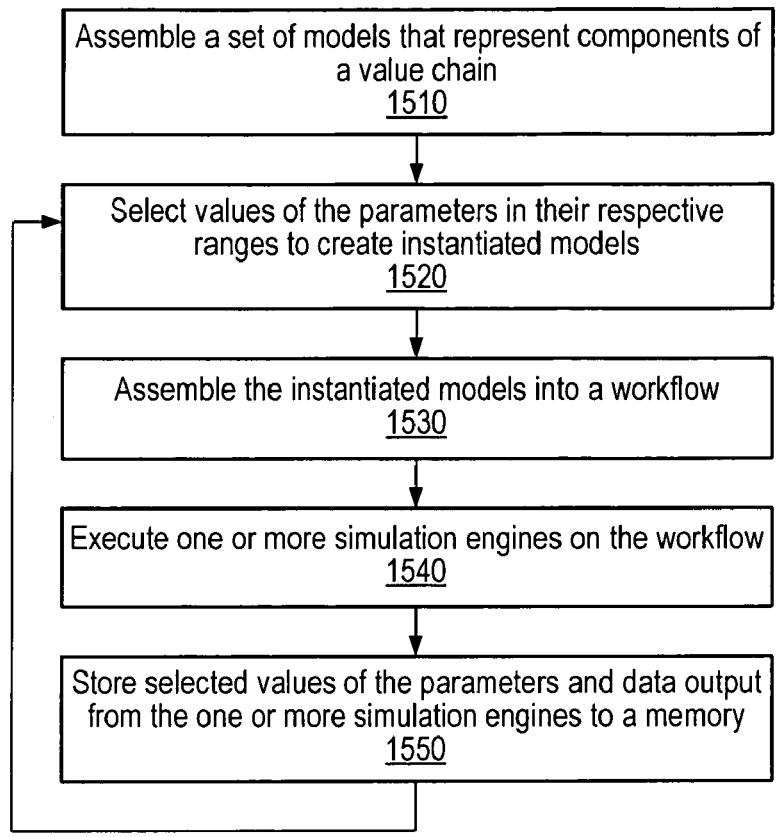
FIG. 14 illustrates one set of embodiments of a method for simulating the effects of uncertainty in planning variables.

In one set of embodiments, a method for simulating the effects of uncertainty in planning variables may be organized as suggested in FIG. 14. In step 1510, a processor may assemble a set of models that represent components of a value chain. Each of the models of the set may include one or more planning variables. Each of the planning variables may vary within a corresponding user-defined range (e.g., an interval of the real line, or a discrete set of values).

In step 1520, the processor may select (i.e., instantiate) values of the planning variables in their respective ranges to create instantiated models.

In step 1530, the processor may assemble the instantiated models into a workflow. A workflow is a set of one or more data structures that are formatted for access by one or more simulation engines. For example, the input data sets $D_E$ and $D_F$ described above form a workflow.

In step 1540, the processor may execute one or more simulation engines on the workflow. The simulation engines may include a reservoir flow simulator and/or an economic computation engine.

In step 1550, the processor may store the selected values of the planning variables and data output from the one or more simulation engines to a memory.

Steps 1520 through 1550 may be repeated a number of times until a termination condition is achieved. In a Monte Carlo mode of operation, the processor may repeat steps 1520 through 1550 a user-specified number of times. (The user may specify a number of iterations during a preliminary setup phase.) In a discrete combinations mode of operation, the processor may repeat steps 1520 through 1550 until all possible combinations of values of the planning variables in their respective ranges have been exhausted. In a sensitivity analysis mode of operation, the processor may repeat steps 1520 through 1550 so as to scan each planning variable $X^J$ through the corresponding range, one at a time, while maintaining all other planning variables at user-defined nominal values.

In one embodiment, the processor may use an experimental design algorithm to generate combinations of values of the planning variables in each repetition (i.e., iteration) of steps 1520 through 1550.

Step 1520, i.e., the process of selecting of values of the planning variables, may include computing quantiles of one or more user-specified probability distributions so that the repetition of steps 1520 through 1550 enacts a Monte Carlo simulation. The user may specify probability distributions for planning variables in various forms. For example, the user may specify a probability distribution for a planning variable by selecting a PDF from a list of standard PDF, and entering PDF characterizing parameters (such as mean and standard deviation) to specify a probability distribution. As another example, the user may specify a probability distribution for a planning variable by entering a finite set of values attainable by the planning variable and corresponding set of probability values (or positive numeric values which may be normalized to probability values). As yet another example, the user may specify a mixed distribution as a linear combination of both continuous (PDF-based) and discrete distributions.

In one set of embodiments, step 1520 includes choosing a value for a planning variable in a user-specified quantile range associated with a corresponding user-specified probability distribution, e.g., a quantile range of the form of the form $[Q_A, Q_B]$, where A and B are integers between zero and 100 inclusive.

In some embodiments (or operating modes), step 1520 may include computing quantiles of the user-specified probability distributions so that said repeating enacts a Monte Carlo simulation with Latin Hypercube sampling.

The method of FIG. 14 may be implemented on a computer system including a processor (or, a set of one or more processors), memory, input devices and output devices. The memory may store program instructions executable by the processor. The processor may implement the method of FIG. 14 by reading program instructions from the memory and executing the program instructions.

The inventive principles described herein for making and using a decision management system are broadly applicable for the planning of commercial and/or industrial projects in any of various problem domains, not merely to the domain of petroleum reservoir exploitation.

Schedule Generation Method

Figure 15:
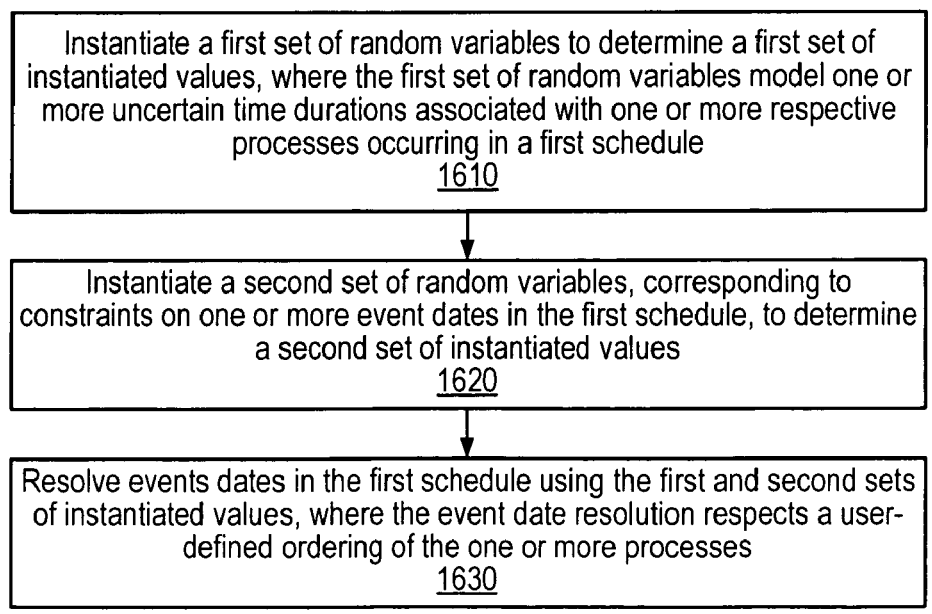
FIG. 15 illustrates one set of embodiments of a method for generating schedules.

In one set of embodiments, a computational method for generating schedules may be arranged as depicted in FIG. 15.

In step 1610, a processor (e.g., processor 102 of FIG. 1) instantiates a first set of one or more random variables to determine a first set of one or more instantiated values. The random variables model one or more uncertain time durations associated with one or more respective processes occurring in the first schedule.

In step 1620, the processor instantiates a second set of one or more random variables, corresponding to constraints on one or more event dates in the first schedule, to determine a second set of one or more instantiated values.

In step 1630, the processor resolves events dates in the first schedule using the first and second sets of instantiated values. The event date resolution respects a user-defined ordering of the one or more processes.

The processor may repeat steps 1610 through 1630 for a second schedule, different from the first schedule.

The random variables of the second set may include one or more random variables that model time-constraints on event dates in the first schedule relative to events in other schedules. Furthermore, the random variables of the second set may include one or more random variables that model time-constraints on event dates in the first schedule relative to fixed calendar dates.

The processor may repeat steps 1610 through 1630 a plurality of times to enact a random simulation. In one embodiment, the instantiations in steps 1610 and 1620 may be performed using a quantile value selection for each of the random variables in the first set and second set. In another embodiment, the instantiations in steps 1610 and 1620 may be performed using Latin-hypercube sampling. In another embodiment, the instantiations in steps 1610 and 1620 may be performed using Hammersly sequence sampling.

Figure 16:
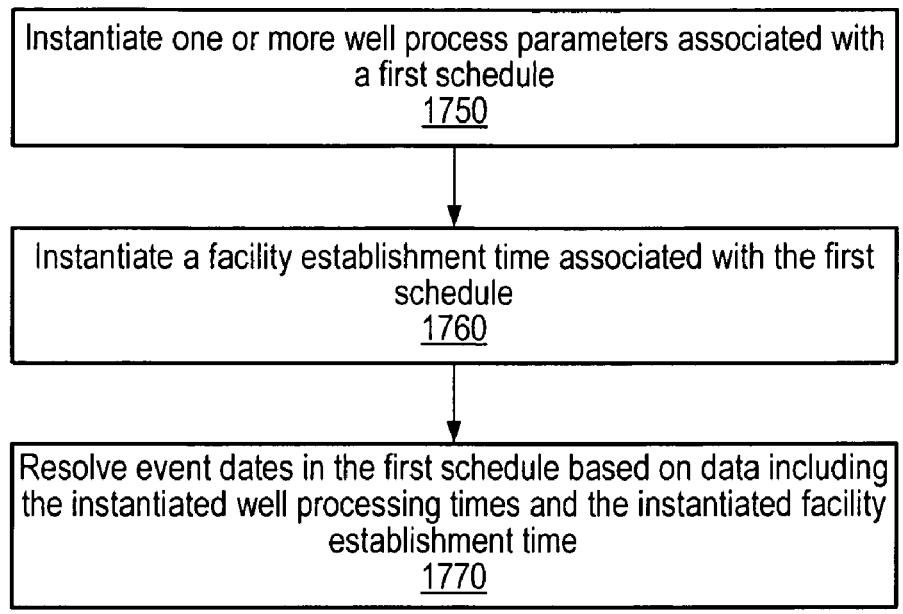
FIG. 16 illustrates another set of embodiments for generating schedules.

In another set of embodiments, the computational method for generating schedules may be arranged as depicted in FIG. 16.

In step 1750, a processor (such as the processor 102 of FIG. 1) may instantiate one or more well process parameters associated with a first schedule.

In step 1760, the processor may instantiate a facility establishment time associated with a first schedule.

In step 1770, the processor may resolve event dates in the first schedule based on data $D_R$ including the instantiated well processing times and the instantiated facility establishment time. The data $D_R$ may also include resolved event dates from one or more other schedules.

Furthermore, the processor may instantiate one or more dependency delay times associated with the first schedule, where each of the dependency delay times is a time delay of an event date in the first schedule relative to an event in another schedule. The data $D_R$ may include the one or more instantiated dependency delay times.

The one or more well process parameters include parameters such as well drilling time and well completion time.

The user may assign a plurality of facilities to the first schedule and may select a parallel mode or a sequential mode for the establishment of facilities. In the parallel mode, the processor performs the event date resolution under the assumption that the facilities are established in parallel. In the sequential mode, the processor performs the event date resolution under the assumption that the facilities are established sequentially.

Furthermore, the processor may repeat steps 1750 through 1770 for each component schedule in a global schedule. The data $D_R$ include the resolved events dates from one or more other component schedules for which step 1750 through 1770 have previously been performed. The processor may sort the event dates from the component schedules in time order; and transferring the event dates to one or more analysis algorithms such as a production profile algorithm and/or an economic analysis algorithm.

In some embodiments, the processor may perform an iterative process including a plurality of iterations. Each iteration may include repeating steps 1750 through 1770 for each component schedule in the global schedule. Thus, the iterative process generates a plurality of instantiations of the global schedule.

The resolved event dates may include drilling start and end dates for a number of wells. The processor may respect a user-specified ordering of wells when resolving the event dates.

When resolving event dates, the processor may set a production start date for a well to a date not earlier than an end date of establishment of an associated facility, and may set an injection start date for a well to a date not earlier than an end date of establishment of an associated facility.

In one embodiment, the processor may compute a total well duration by adding the one or more instantiated well process parameters and compute completion end dates for each well in a set of wells associated with the first schedule using: a resolved value of a start date of the first schedule date, the total well duration, and a user defined ordering of the set of wells.

As part of the event date resolution, the processor may set a production start date for a first well of the set of wells equal to the later of the completion end date of the first well and a facility establishment end date of a facility connected to the first well.

Figure 17:
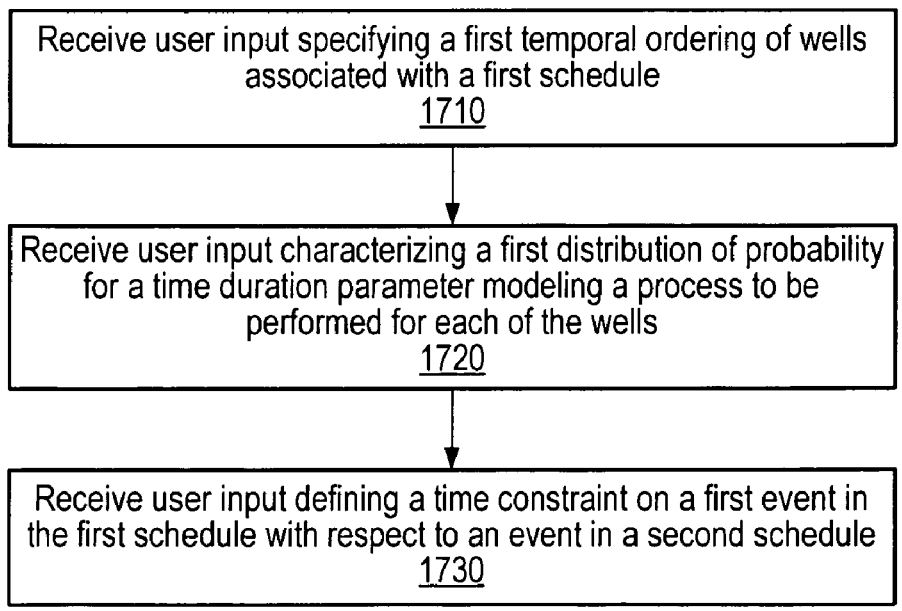
FIG. 17 illustrates one set of embodiments of a method of managing a user interface.

In one set of embodiments, a computational method for managing a graphical user interface may be arranged as illustrated in FIG. 17.

In step 1710, a processor (such as processor 102 of FIG. 1) may receive user input specifying a first temporal ordering of wells associated with a first schedule.

In step 1720, the processor may receive user input characterizing a first distribution of probability for a time duration parameter modeling a process to be performed for each of the wells.

In step 1730, the processor may receive user input defining a time constraint on a first event in the first schedule with respect to an event in a second schedule.

Furthermore, the processor may display an ordered list of the wells from which the user may make selections. The user input received in step 1710 may include one or more user commands, where each of the user commands specifies: (a) a particular well in the ordered list of the wells and (b) whether the particular well is to be moved up or down in the ordered list of the wells.

In one embodiment, the user input received in step 1710 may specify that an automated ranking generated by a software tool (such as the asset planning tool) is to be used as the first temporal ordering.

In some embodiments, the user input received in step 1710 may specify that a randomly-generated ordering is to be used as the first temporal ordering.

The time duration parameter may be a time duration for drilling each of the wells associated with the first schedule. Alternatively, the time duration parameter may be a time duration for completing each of the wells. As yet another alternative, the time duration parameter may be a time duration for perforating each of the wells.

The user input received in step 1720 may include: a selection from a list of standard probability density functions (PDFs), and a specification of one or more PDF characterizing parameters.

The user input received in step 1730 may include parameters characterizing a random time delay of the first event relative to the event in the second schedule.

Capital and Expense Calculations Dependent on Resolved Event Dates

In one set of embodiments, the economic computation engine may compute a total cost for a facility based on instantiated values of facility cost components such as facility design cost, facility construction cost and the instantiated values for the time duration of various phases in the facility establishment process. The uncertainty of these facility cost components and phase durations may be specified by the user, e.g., through the GUI of the schedule configuration tool. (In one alternative embodiment, the average values of the facility cost components and phase durations may be specified by a software program such as the asset planning tool, and the user may specify a probability distribution centered on each average value.) The economic computation engine may compute a facility expenditure rate for the facility using the total facility cost and the resolved start and end dates of facility establishment (or the resolved dates of the various facility establishment phases). For example, the economic computation engine may compute a monthly facility expenditure rate by dividing the total facility cost by the facility establishment time (as determined by the resolved event dates for facility establishment) and multiplying the division result by the fraction $365/12$.

The total facility cost changes with each iteration of the iterative process because each iteration produces different sets of instantiated values for facility cost components and the phase durations. The economic computation engine may compute a histogram for the total facility cost taken over a plurality of iterations of the iterative process.

The economic computation engine may also compute a total cost for drilling a well based on instantiated values of drilling cost components such as drilling rig cost per unit time, energy cost per unit time, costs of materials and the instantiated values of drilling time and drilling delays. The user may specify the uncertainty of the drilling cost components, the drilling time and drilling delays, e.g., through the GUI of the schedule configuration tool. (In one alternative embodiment, the average values of the drilling cost components, the drilling time and the drilling delays may be specified by a software program such as the asset planning tool, and the user may specify a probability distribution centered on each average value.) The economic computation engine may compute a drilling expenditure rate for the well using the total drilling cost and the resolved event dates for drilling and drilling delays. For example, the economic computation engine may compute a monthly drill expenditure rate by dividing the total drilling cost by a sum of the instantiated drilling time and drilling delays and multiplying the division result by the fraction $^{365}/_{12}$. Note that drilling rigs are costed by the day. So a delay (e.g., a storm) increases the drilling cost. Similarly, using multiple drilling rigs costs by the day.

The total well drilling cost changes with each iteration of the iterative process because each iteration produces a different set of instantiated values for the drilling cost components, drilling time and drilling delays. The economic computation engine may compute a histogram for the total drilling cost taken over a plurality of iterations of the iterative process.

The economic computation engine may similarly compute a total completion cost and an completion expenditure rate for a well based on instantiated values of completion cost components, completion time and completion delays for the well. The total completion cost changes with each iteration of the iterative process because each iteration produces a different set of instantiated values for the completion cost components, completion time and completion delays. The economic computation engine may compute a histogram for the total completion cost taken over a plurality of iterations of the iterative process. Note that well completion units are also costed by the day.

Figure 18:
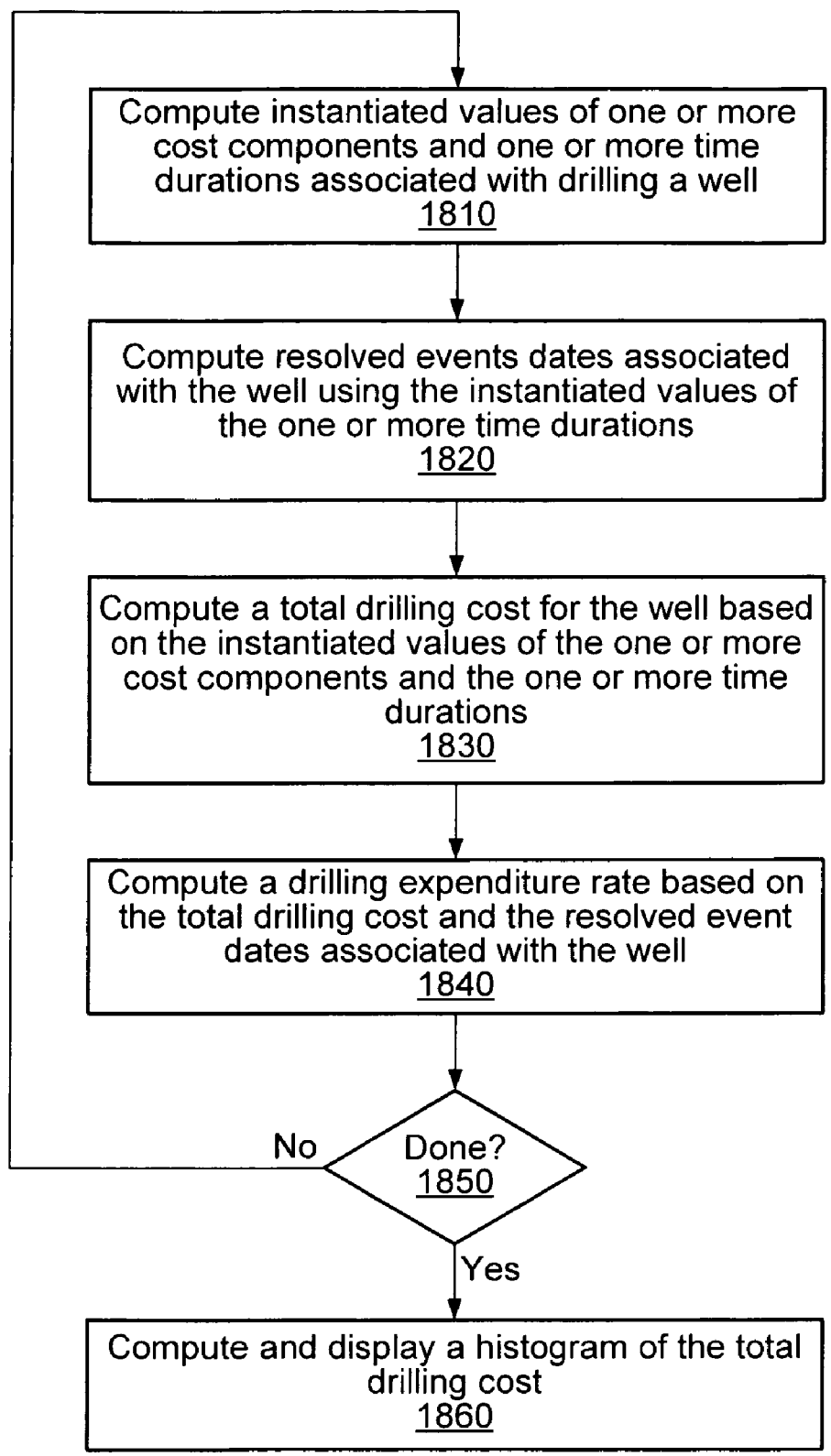
FIG. 18 illustrates one embodiment of a method for displaying the economic impact of uncertainties in well drilling.

In one set of embodiments, a method for displaying the economic impact of uncertainties in well drilling may be arranged as illustrated in FIG. 18.

In step 1810, a processor (such as the processor 102 of FIG. 1) may compute instantiated values of one or more cost components and one or more time durations associated with drilling a well.

In step 1820, the processor may compute resolved events dates associated with the well using the instantiated values of the one or more time durations.

In step 1830, the processor compute a total drilling cost for the well based on the instantiated values of the one or more cost components and the one or more time durations.

In step 1840, the processor may compute a drilling expenditure rate based on the total drilling cost and the resolved event dates associated with the well.

In step 1850, the processor may determine if a termination condition is satisfied. If the termination condition is not satisfied, the processor continues with step 1810 in order to perform another iteration of steps 1810 through 1840. If the termination condition is satisfied, the processor may continue with step 1860.

In step 1860, the processor may compute and display a histogram of the total drilling cost taken over the plurality of iterations of the iteration loop including steps 1810 through 1840.

The one or more time durations may include a time for drilling the well and at least one drilling delay time.

Figure 19:
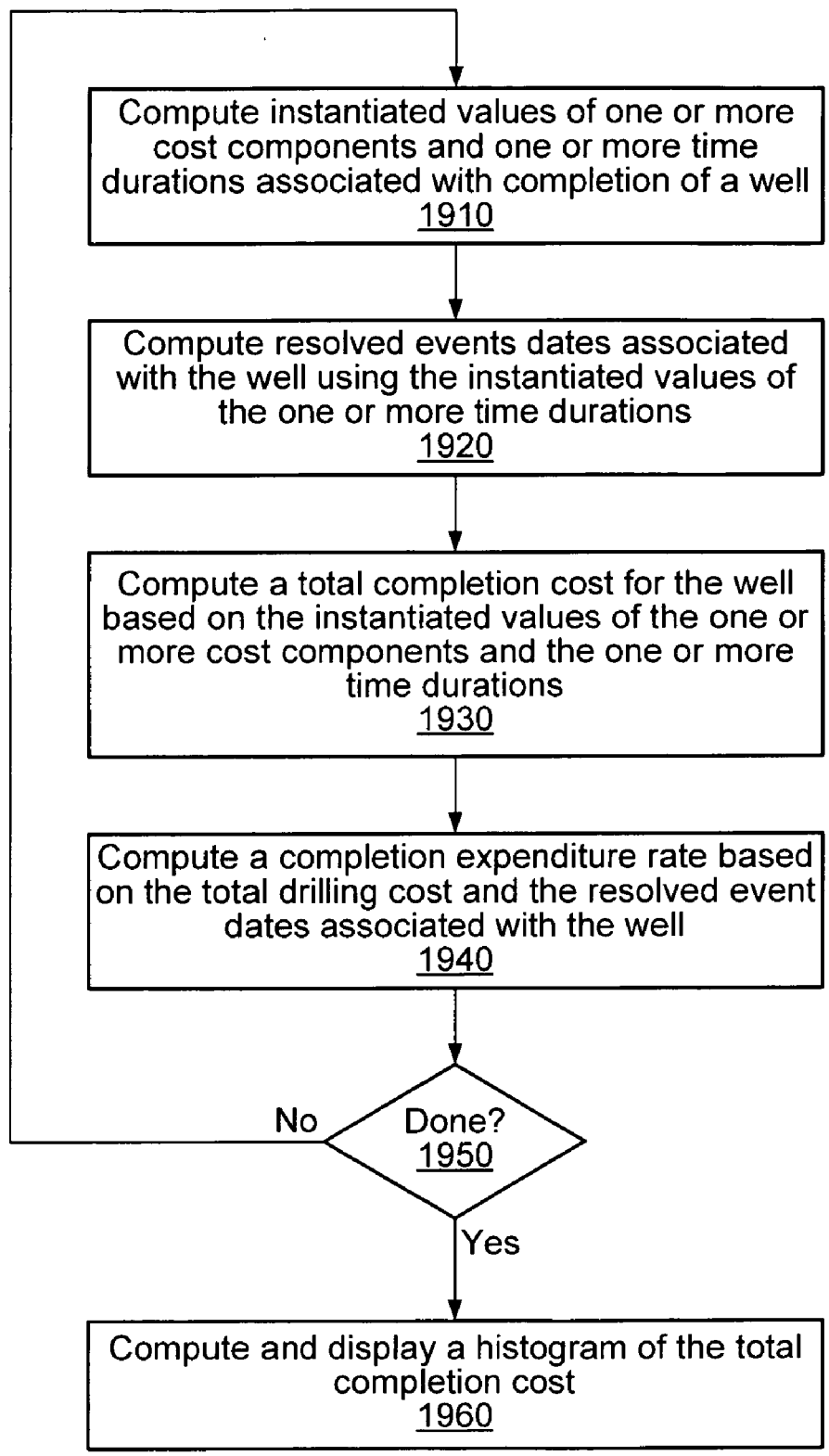
FIG. 19 illustrates one embodiment of a method for displaying the economic impact of uncertainties in well completion.

In one set of embodiments, a method for displaying the economic impact of uncertainties in well completion may be arranged as illustrated in FIG. 19.

In step 1910, a processor (such as the processor 102 of FIG. 1) may compute instantiated values of one or more cost components and one or more time durations associated with completion of a well.

In step 1920, the processor may compute resolved events dates associated with the well using the instantiated values of the one or more time durations.

In step 1930, the processor may compute a total completion cost for the well based on the instantiated values of the one or more cost components and the one or more time durations.

In step 1940, the processor may compute a completion expenditure rate based on the total drilling cost and the resolved event dates associated with the well.

In step 1950, the processor may determine if a termination condition is satisfied. If the termination condition is not satisfied, the processor continues with step 1910 in order to perform another iteration of steps 1910 through 1940. If the termination condition is satisfied, the processor may continue with step 1960.

In step 1960, the processor may compute and display a histogram of the total completion cost.

The one or more time durations may include a time for completion of the well and at least one completion delay time.

Figure 20:
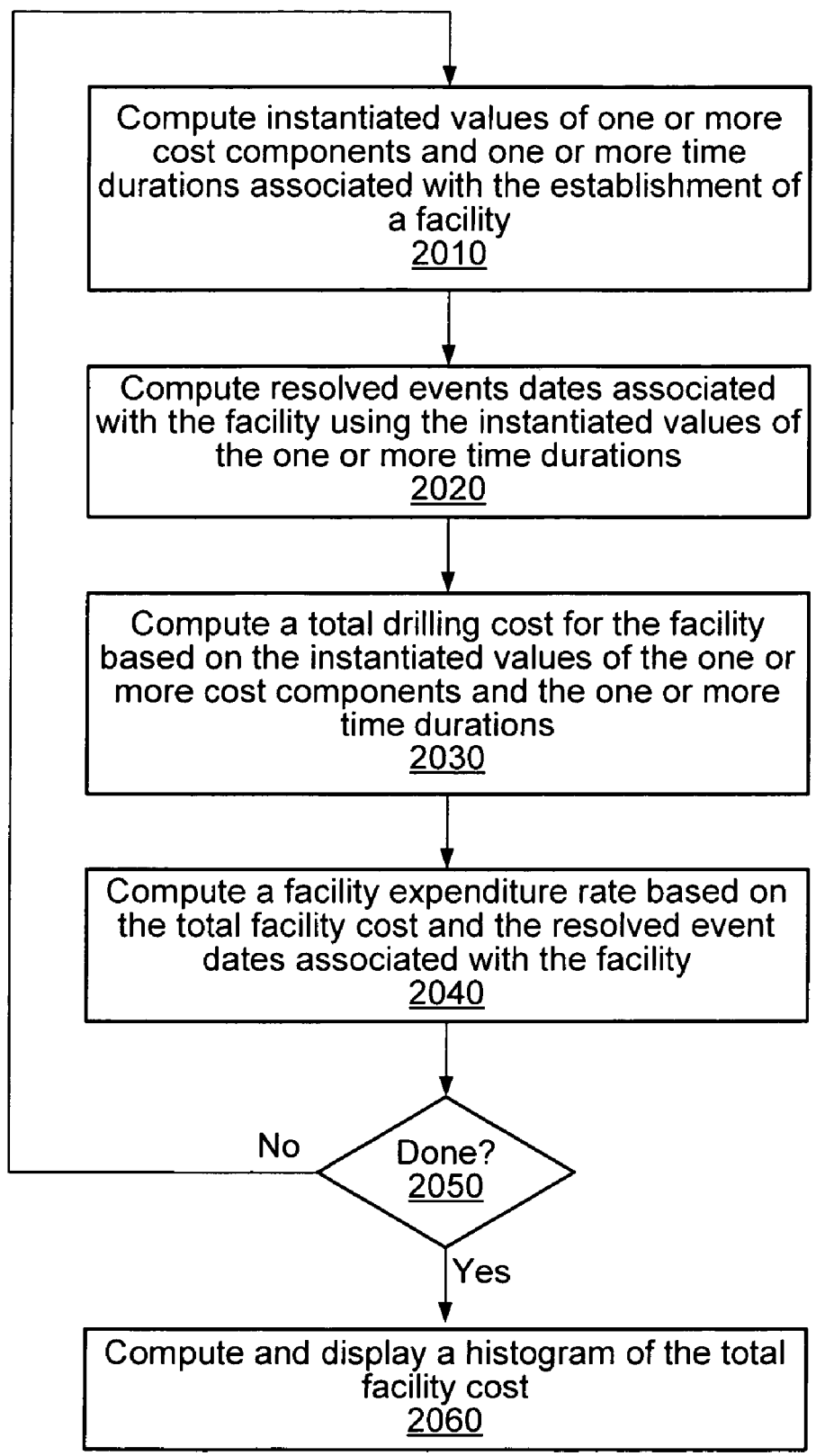
FIG. 20 illustrates one embodiment of a method for displaying the economic impact of uncertainties in facilities establishment.

In one set of embodiments, a method for displaying the economic impact of uncertainties in facility establishment may be arranged as illustrated in FIG. 20.

In step 2010, a processor (such as the processor 102 of FIG. 1) may compute instantiated values of one or more cost components and one or more time durations associated with the establishment of a facility.

In step 2020, the processor may compute resolved events dates associated with the facility using the instantiated values of the one or more time durations.

In step 2030, the processor may compute a total facility cost for the facility based on the instantiated values of the one or more cost components and the one or more time durations;

In step 2040, the processor may compute a facility expenditure rate based on the total facility cost and the resolved event dates associated with the facility.

In step 2050, the processor may determine if a termination condition is satisfied. If the termination condition is not satisfied, the processor continues with step 2010 in order to perform another iteration of steps 2010 through 2040. If the termination condition is satisfied, the processor may continue with step 2060.

In step 2060, the processor may compute and display a histogram of the total facility cost.

The one or more time durations may include a time for designing the facility, a time for construction of the facility, and so on. Furthermore, the one or more time durations include one or more time delays associated with establishment of the facility.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method comprising:
   (a) the computer instantiating a first set of one or more random variables, that model one or more uncertain time durations associated with one or more respective processes occurring in a first schedule, to determine one or more first instantiated values;
   (b) the computer instantiating a second set of one or more random variables, corresponding to constraints on one or more event dates in the first schedule, to determine one or more second instantiated values;
   (c) the computer resolving the event dates in the first schedule using the first and second instantiated values, wherein said resolving respects a user-defined ordering of the one or more processes; and
   (d) the computer displaying a visual representation of at least the first schedule, wherein the visual representation includes an indication of the resolved event dates.

2. The method of claim 1, further comprising:
the computer repeating (a), (b), (c) for a second schedule.

3. The method of claim 2, wherein at least one of the random variables of the second set models a time-constraint on an event date in the first schedule relative to an event in the second schedule.

4. The method of claim 1, wherein at least one of the random variables of the second set models a time-constraint on an event date in the first schedule relative to a fixed calendar date.

5. The method of claim 1, further comprising:
the computer repeating (a), (b) and (c) a plurality of times to enact a random simulation.

6. The method of claim 5, wherein (a) and (b) are performed using a quantile value selection for each of the random variables in the first set and second set.

7. The method of claim 5, wherein (a) and (b) are performed using Latin-hypercube sampling.

8. The method of claim 5, wherein (a) and (b) are performed using Hammersly sequence sampling.

9. A computer-implemented method for implementing a graphical user interface on a computer system, the method comprising:
(a) the computer receiving first user input specifying a first temporal ordering of wells associated with a first schedule;
(b) the computer receiving second user input characterizing a first distribution of probability for a time duration parameter modeling an uncertain time duration of a process to be performed for each of the wells;
(c) the computer receiving third user input defining a time constraint on a first event in the first schedule with respect to an event in a second schedule; and
the computer displaying a visual representation of at least a first instantiation of the first schedule, wherein the visual representation of the first instantiation of the first schedule includes an indication of at least one event date for each of the wells.

10. The method of claim 9 further comprising the computer displaying an ordered list of the wells, wherein (a) comprises the computer receiving one or more user commands, wherein each of said user commands specifies:
a particular well in the ordered list of the wells; and
whether the particular well is to be moved up or down in the ordered list of the wells.

11. The method of claim 9, wherein the first user input specifies that an automated ranking generated by a software tool is to be used as the first temporal ordering.

12. The method of claim 9, wherein the first user input specifies that a randomly-generated ordering is to be used as the first temporal ordering.

13. The method of claim 9, wherein the time duration parameter is a time duration for drilling each of said wells.

14. The method of claim 9, wherein the time duration parameter is a time duration for completing each of said wells.

15. The method of claim 9, wherein the time duration parameter is a time duration for perforating each of said wells.

16. The method of claim 9, wherein the second user input characterizing the first distribution of probability includes:
a selection from a list of standard probability density functions (PDFs), and
a specification of one or more PDF characterizing parameters.

17. The method of claim 9, wherein the third user input that defines the time constraint includes parameters characterizing a random time delay of the first event relative to the event in the second schedule.

18. The method of claim 9, wherein the first user input specifies that a duration of a process for each well is generated by an automated software tool.

19. A computer-implemented method comprising:
(a) the computer instantiating one or more well process parameters, wherein each of the one or more well process parameters represents an uncertain time duration for a well-related task associated with a first schedule;
(b) the computer instantiating a facility establishment time associated with the first schedule;
(c) the computer resolving event dates in the first schedule based on data including the instantiated well process parameters and the instantiated facility establishment time; and
the computer displaying a visual representation of at least the first schedule, wherein the visual representation includes an indication of the resolved event dates.

20. The method of claim 19 further comprising the computer instantiating one or more dependency delay times associated with the first schedule, wherein each of the dependency delay times is a time delay of an event date in the first schedule relative to an event in a second schedule.

21. The method of claim 20, wherein the data farther comprises the one or more instantiated dependency delay times.

22. The method of claim 19, wherein the data further comprises resolved event dates in one or more other schedules.

23. The method of claim 19, wherein the one or more well process parameters include a well drilling time.

24. The method of claim 19, wherein the one or more well process parameters include a well completion time.

25. The method of claim 19, wherein the one or more well process parameters include a well perforation time.

26. The method of claim 19 further comprising the computer receiving user input assigning a plurality of facilities to the first schedule, wherein said resolving event dates assumes a parallel establishment of the plurality of facilities.

27. The method of claim 19, wherein said resolving event dates assumes that establishment processes for a plurality of facilities associated with the first schedule occur sequentially.

28. The method of claim 19 further comprising:
(d) the computer performing (a), (b) and (c) for each component schedule in a global schedule, wherein said data includes resolved events dates from one or more other component schedules for which (a), (b) and (c) have already been performed.

29. The method of claim 28, further comprising:
(e) the computer performing (d) a plurality of times.

30. The method of claim 28 further comprising:
the computer sorting said event dates from the component schedules in time order; and
the computer transferring the event dates to an analysis algorithm.

31. The method of claim 30, wherein the analysis algorithm is a production profile algorithm.

32. The method of claim 30, wherein the analysis algorithm is an economic analysis algorithm.

33. The method of claim 19, wherein the resolved event dates include drilling start and end dates for a number of wells, wherein said resolving the event dates respects a user-specified ordering of wells.

34. The method of claim 33 further comprising the computer receiving user input defining the well ordering.

35. The method of claim 19, wherein said resolving of event dates comprises the computer setting a production start date for a well to a date not earlier than an end date of establishment of an associated facility.

36. The method of claim 19, wherein said resolving of event dates comprises the computer setting an injection start date for a well to a date not earlier than an end date of establishment of an associated facility.

37. The method of claim 19, wherein said resolving event dates includes:
the computer computing a total well duration by adding the one or more instantiated well process parameters, the computer computing completion end dates for each well in a set of wells associated with the first schedule using a resolved value of a start date of the first schedule the total well duration, and a user defined ordering of the set of wells.

38. The method of claim 37, wherein said resolving event dates further includes:
the computer setting a production start date for a first well of the set of wells equal to the later of the completion end date of the first well and a facility establishment end date of a facility connected to the first well.

39. A system comprising:
a memory that stores program instructions and data;
a processor configured to read the program instructions from the memory, wherein, in response to execution of the program instructions, the processor is operable to:
(a) instantiate one or more well process parameters, wherein each of the well process parameters represents an uncertain time duration for a well-related task associated with a first schedule;
(b) instantiate a facility establishment time associated with first schedule;
(c) resolve event dates in the first schedule based on resolved events date in one or more other schedules, the instantiated well processing times, and the instantiated facility establishment time.

40. A computer-readable memory medium that stores program instructions, wherein the program instructions are configured to direct a computer system to perform operations comprising:
(a) the computer system instantiating one or more well process parameters, wherein each of the one or more well process parameters represents an uncertain time duration for a well-related task associated with a first schedule;
(b) the computer system instantiating a facility establishment time associated with first schedule;
(c) the computer system resolving event dates in the first schedule based on resolved events date in one or more other schedules, the instantiated well processing times, and the instantiated facility establishment time.

41. A computer-implemented method comprising:
(a1) the computer computing instantiated values of one or more uncertain cost components and one or more uncertain time durations associated with drilling a well;
(a2) the computer computing one or more resolved events dates associated with the well using the instantiated values of the one or more uncertain time durations;
(a3) the computer computing a total drilling cost for the well based on the instantiated values of the one or more uncertain cost components and the one or more uncertain time durations;
(b) the computer repeating a set of operations including (a1), (a2) and (a3) a plurality of times;
(c) the computer computing and displaying a histogram of the total drilling cost from said plurality of repetitions.

42. The method of claim 41, wherein the set of operations also includes:
(a4) the computer computing a drilling expenditure rate based on the total drilling cost and the one or more resolved event dates associated with the well.

43. The method of claim 41, wherein the one or more uncertain time durations include a time for drilling the well and at least one drilling delay time.

44. A computer-implemented method comprising:
(a1) the computer computing instantiated values of one or more uncertain cost components and one or more uncertain time durations associated with completion of a well;
(a2) the computer computing one or more resolved events dates associated with the well using the instantiated values of the one or more uncertain time durations;
(a3) the computer computing a total completion cost for the well based on the instantiated values of the one or more uncertain cost components and the one or more uncertain time durations;
(b) the computer repeating a set of operations including (a1), (a2) and (a3) a plurality of times;
(c) the computer computing and displaying a histogram of the total completion cost from said plurality of repetitions.

45. The method of claim 44, wherein the set of operations also includes:
(a4) the computer computing a completion expenditure rate based on the total drilling cost and the one or more resolved event dates associated with the well.

46. The method of claim 44, wherein the one or more uncertain time durations include a time for completion of the well and at least one completion delay time.

47. A computer-implemented method comprising:
(a1) the computer computing instantiated values of one or more uncertain cost components and one or more uncertain time durations associated with establishing a facility;
(a2) the computer computing one or more resolved events dates associated with the facility using the instantiated values of the one or more uncertain time durations;
(a3) the computer computing a total facility cost for the facility based on the instantiated values of the one or more uncertain cost components and the one or more uncertain time durations;
(b) the computer repeating a set of operations including (a1), (a2) and (a3) a plurality of times;
(c) the computer computing and displaying a histogram of the total facility cost from said plurality of repetitions.

48. The method of claim 47, wherein the set of operations also includes:
(a4) the computer computing a facility expenditure rate based on the total facility cost and the resolved one or more event dates associated with the facility.

49. The method of claim 47, wherein the one or more uncertain time durations include a time for designing the facility.

50. The method of claim 47, wherein the one or more uncertain time durations include a time for construction of the facility.

51. The method of claim 47, wherein the one or more uncertain time durations include one or more time delays associated with establishment of the facility.

* * * * *